(12) United States Patent
Chiu et al.

(10) Patent No.: US 10,798,359 B2
(45) Date of Patent: Oct. 6, 2020

(54) GENERATING HI-RES DEWARPED BOOK IMAGES

(71) Applicant: FUJI XEROX CO., LTD., Tokyo (JP)

(72) Inventors: Patrick Chiu, Mountain View, CA (US); Michael Patrick Cutter, Santa Cruz, CA (US); Chelhwon Kim, Santa Cruz, CA (US); Surendar Chandra, Sunnyvale, CA (US)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 49 days.

(21) Appl. No.: 15/970,977

(22) Filed: May 4, 2018

(65) Prior Publication Data

US 2018/0255287 A1  Sep. 6, 2018

Related U.S. Application Data

(62) Division of application No. 13/690,564, filed on Nov. 30, 2012, now Pat. No. 9,992,471.
(Continued)

(51) Int. Cl.
*H04N 13/10* (2018.01)
*H04N 13/239* (2018.01)
(Continued)

(52) U.S. Cl.
CPC .......... *H04N 13/10* (2018.05); *G06T 3/0093* (2013.01); *G06T 15/00* (2013.01); *G06T 17/00* (2013.01);
(Continued)

(58) Field of Classification Search
CPC ........ H04N 13/10; H04N 13/239; G06K 9/32; G06T 15/00; G06T 17/00; G06T 17/20; G06T 19/20; G16Q 40/02
(Continued)

(56) References Cited

U.S. PATENT DOCUMENTS 5,581,638 A   12/1996 Givens et al.
8,676,273 B1   3/2014 Fujisaki et al.
(Continued)

OTHER PUBLICATIONS

Bradski, Gary, et al. "Learning OpenCV." O'Reilly, 2008.
(Continued)

*Primary Examiner* — Thai Q Tran
*Assistant Examiner* — Syed Y Hasan
(74) *Attorney, Agent, or Firm* — Sughrue Mion, PLLC

(57) ABSTRACT

Systems and methods for generating high resolution dewarped images for an image of a document captured by a 3D stereo digital camera system, or a mobile phone camera capturing a sequence of images, which may improve OCR performance. Example embodiments include a compact stereo camera with two sensors mounted at fixed locations, and a multi-resolution pipeline to process and to dewarp the images using a three dimensional surface model based on curve profiles of the computed depth map. Example embodiments also include a mobile phone including a camera which captures a sequence of images, and a processor which computes a disparity map using the captured sequence of image frames, computes a model of the at least one document page by generating a cylindrical three dimensional geometric surface using the computed disparity map, and renders a dewarped image from the computed model.

12 Claims, 30 Drawing Sheets

Related U.S. Application Data

(60) Provisional application No. 61/611,434, filed on Mar. 15, 2012.

(51) Int. Cl.

| | | |
|---|---|---|
| *G06T 17/20* | (2006.01) | |
| *G06T 3/00* | (2006.01) | |
| *G06T 17/00* | (2006.01) | |
| *G06T 19/20* | (2011.01) | |
| *G06T 13/20* | (2011.01) | |
| *G06K 9/32* | (2006.01) | |
| *G06T 15/00* | (2011.01) | |

(52) U.S. Cl.
CPC .............. *G06T 17/20* (2013.01); *G06T 19/20* (2013.01); *H04N 13/239* (2018.05); *G06K 9/32* (2013.01); *G06K 9/325* (2013.01); *G06K 9/3208* (2013.01); *G06T 2207/10012* (2013.01); *G06T 2207/30176* (2013.01); *G06T 2210/44* (2013.01); *G06T 2219/021* (2013.01); *G06T 2219/2021* (2013.01)

(58) Field of Classification Search
USPC .................. 345/633; 358/462, 488; 382/219
See application file for complete search history.

(56) References Cited

U.S. PATENT DOCUMENTS

| | | | | |
|---|---|---|---|---|
| 9,129,340 B1* | 9/2015 | Medina, III | ....... | G06Q 20/0425 |
| 2010/0073735 A1* | 3/2010 | Hunt | ..................... | G06T 3/0031 |
| | | | | 358/462 |
| 2010/0165087 A1* | 7/2010 | Corso | ..................... | G06K 9/32 |
| | | | | 348/65 |
| 2010/0202026 A1* | 8/2010 | Chiu | ..................... | H04N 1/107 |
| | | | | 358/488 |
| 2011/0298824 A1* | 12/2011 | Lee | ......................... | G06F 3/011 |
| | | | | 345/633 |
| 2012/0256906 A1 | 10/2012 | Ross et al. | | |

OTHER PUBLICATIONS

Fu, Bin, et al. "A Model-based Book Dewarping Method Using Text Line Detection." CBDAR 2007, pp. 63-70.
Fujifilm FinePix W3 specifications. http://www.fujifilm.com/products/3d/camera/finepix_real3dw3/specifications, (link visited Aug. 14, 2012).
Meijering E., et al. "A Note on Cubic Convolution Interpolation." IEEE Transactions in Image Processing, vol. 12, No. 4, pp. 477-479, Apr. 2003.
OpenCV Wiki. http://opencv.willowgarage.com/wiki/, (link visited Aug. 14, 2002).
Shafait, F., et al. "Document image dewarping contest" CBDAR 2007.
Szeliski, R. "Computer Vision: Algorithms and Applications." Springer, 2010.
Tesseract OCR. http://code.google.com/p/tesseract-ocr/ (link visited Aug. 14, 2002).
Beardsley, P., Zisserman A., Murray, D."Sequential Updating of Projective and Affine Structure from Motion", Intl. J. of Computer Vision (23), No. 3, Jun.-Jul. 1997, pp. 235-259.
Chiu, P, Cutter, M.P, "Generating Hi-Res Dewarped Book Images from a Compact 3D Stereo Camera", FXPAL-IP-11-012, Jun. 1, 2012.
Cutter, M.P., Chiu, P. "System and Method for Capturing and Dewarping Book Images with a 3D Stereo Camera", FXPAL-IP-11-005, Jun. 1, 2012.
Cutter, M.P., Chiu, P. "Capture and dewarping of page spreads with a handheld compact 3D camera" Proceedings of DAS 2012, pp. 205-209.
Nakajima, N. Iketani A.., Sato, T., Ikeda, S., Kanbara, M., Yokoya, N. "Video mosaicing for document imaging" Proceedings of CBDAR 2007, pp. 171-178.
Newman W., Dance C., Taylor A., Taylor S., Taylor M., Aldhous T. (1999) "CamWorks: a video-based tool for efficient capture from paper source documents" Proc. Intl. Conf. on Multimedia Computing and Systems (ICMCS '99), pp. 647-653.
Rother, C., Kolmogorov, V., Blake, A." Grabcut: interactive foreground extraction using iterated graph cuts", Proceedings of Siggraph '04, pp. 309-314.
Taylor, M. J., Dance, C. R. (1998), "Enhancement of Document Images from Cameras", In SPIE Conference on Document Recognition V, 3305,1998, pp. 230-241.
Triggs, B, McLauchlan, P., Hartley, R., Fitzgibbon, A. "Bundle Adjustment—A Modern Synthesis", Proc. ICCV '99, pp. 298-372.
Brown, Lisa G. "A survey of Image Registration Techniques", Department of Computer Science, vol. 24. No. 4, pp. 325-376, Columbia University, New York, NY 10027, Dec. 1992.
Brown, et al. "Conformal Deskewing of Non-Planar Documents" Proceedings of the IEEE Computer Society Conference on Computer Vision and Pattern Recognition, 2005.
Cao, et al. "Rectifying the Bound Document Image Captured by the Camera: A Model Based Approach" Proceedings of the Seventh International Conference on Document Analysis and Recognition, 2003.
Koo, et al. "Composition of a Dewarped and Enhanced Document Image From Two View Images", IEEE Transactions on Image Processing, vol. 18, No. 7, Jul. 2009.
Liang, et al. "Geometric Rectification of Camera-Captured Document Images" IEEE Transactions on Pattern Analysis and Machine Intelligence, vol. 30, No. 4, Apr. 2008.
Suzuki, et al "Correction of Geometric and Photometric Distortion of Document Images Using a Stereo Camera System" Department of Mechanical Engineering, Shizuoka University, Japan, Department of Mechanical Engineering, California Institute of Technology.
Shi J., Tomasi, C. "Good features to track", Proceedings of CVPR '94, pp. 593-600.

\* cited by examiner

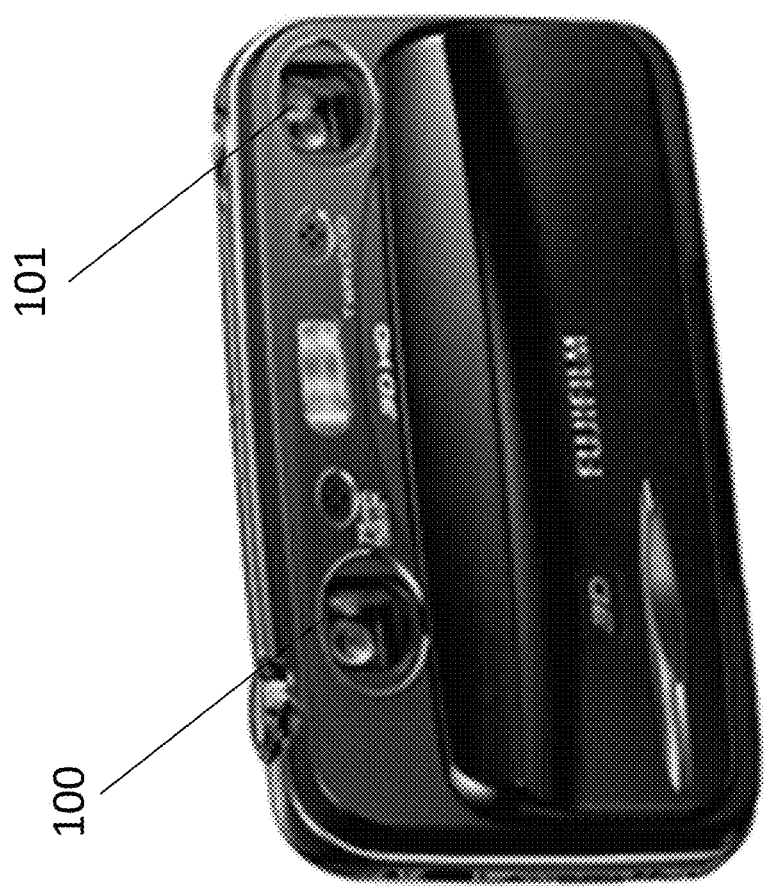

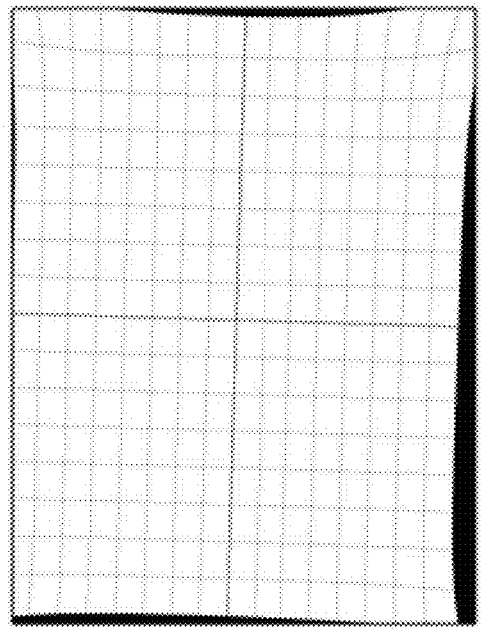
FIG. 6(b) $M_{xx}$
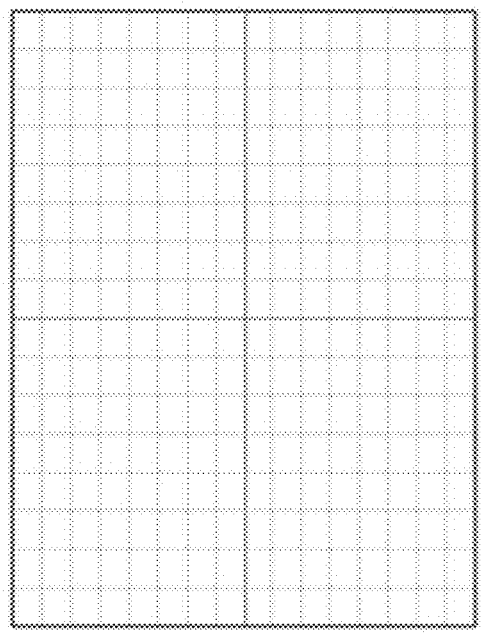
FIG. 6(a) Regular mesh

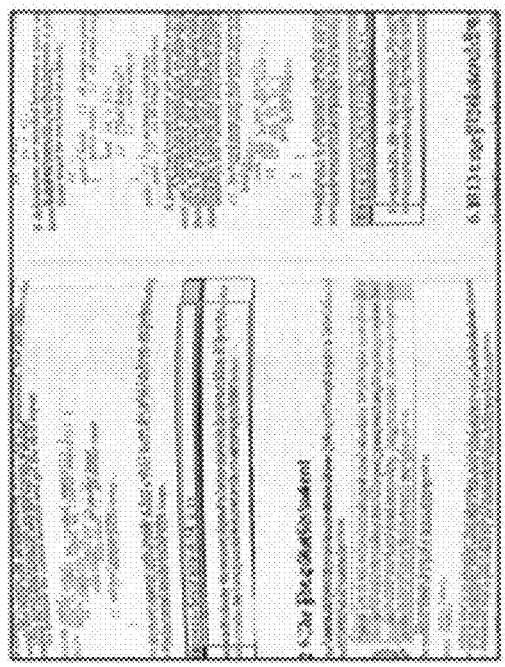
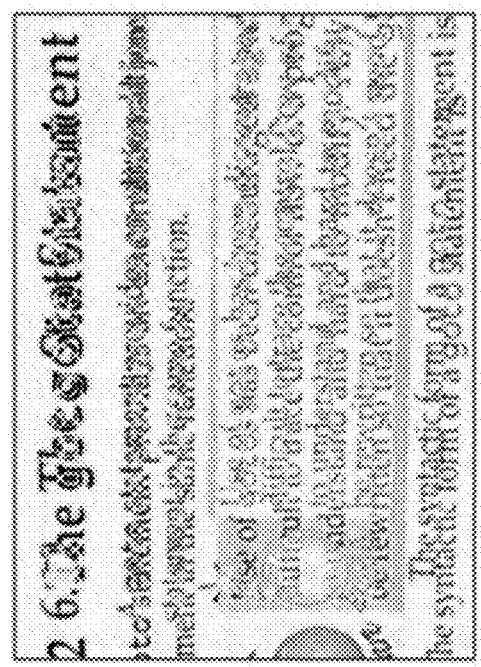
FIG. 8(a)
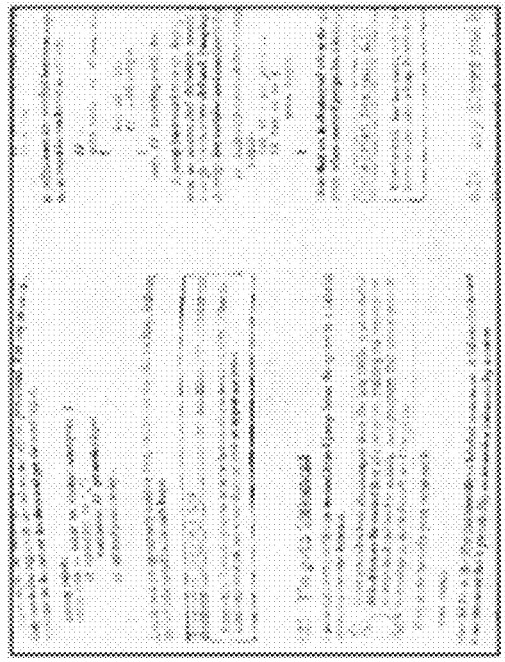
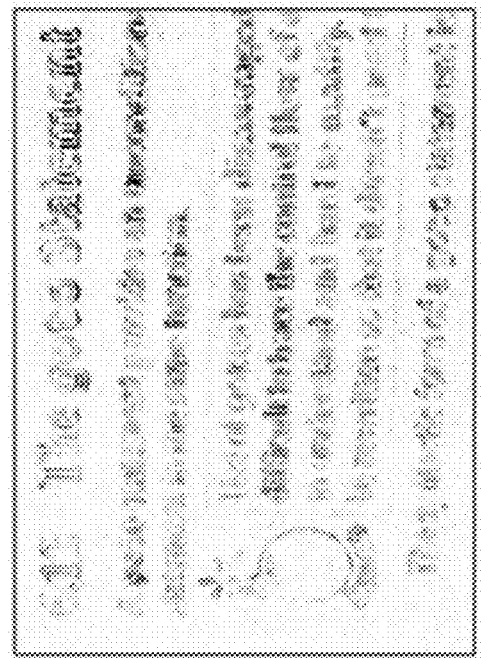
FIG. 8(b)

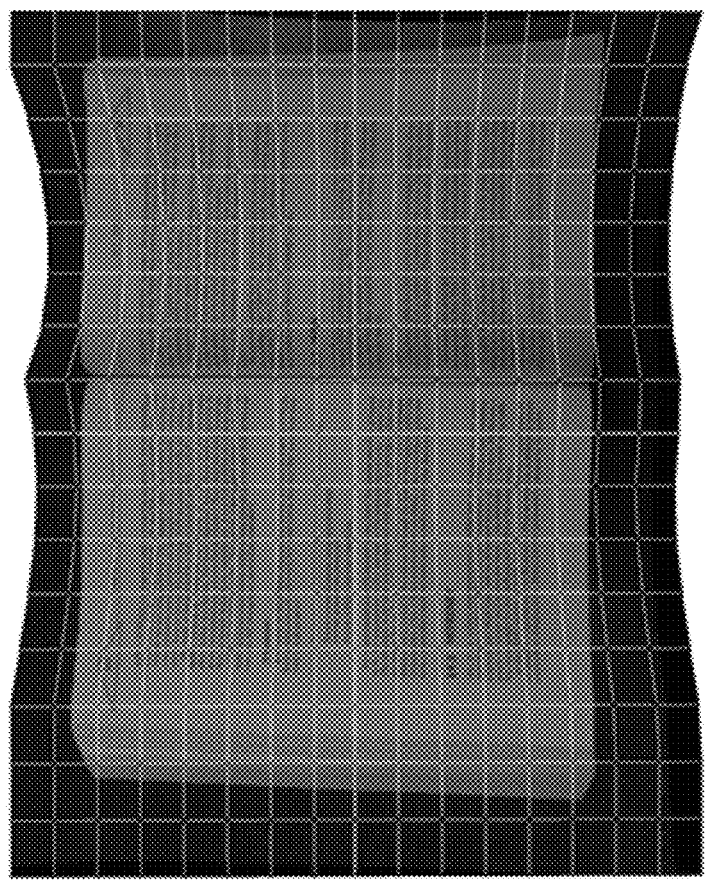
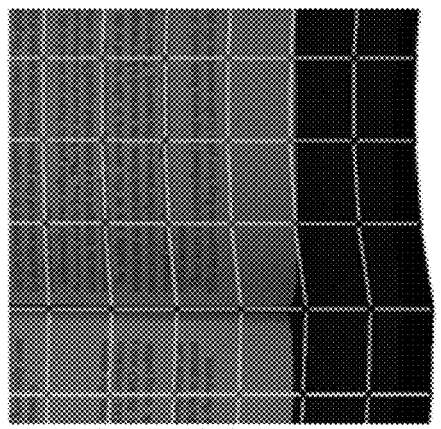
FIG. 12(a)
FIG. 12(b)

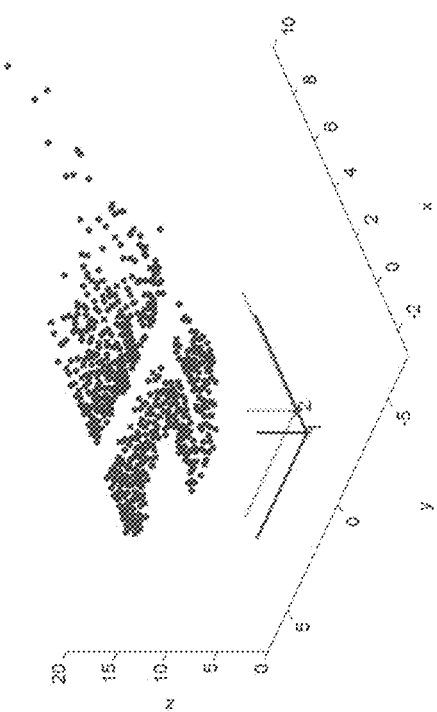
FIG. 27(b) well-conditioned structure
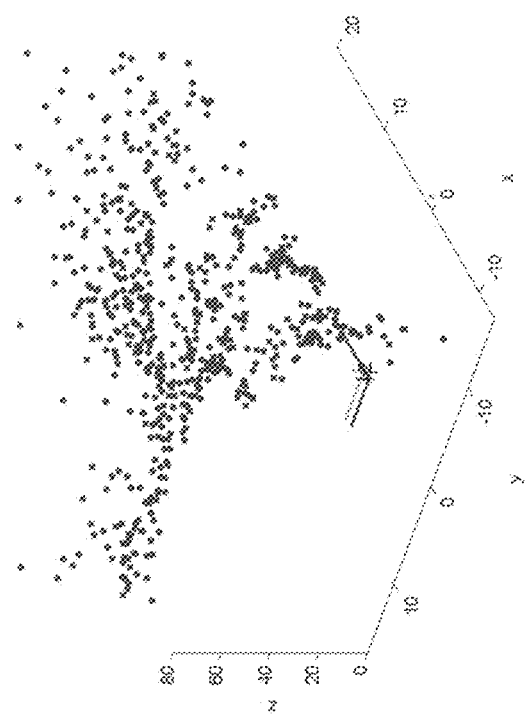
FIG. 27(a) ill-conditioned structure

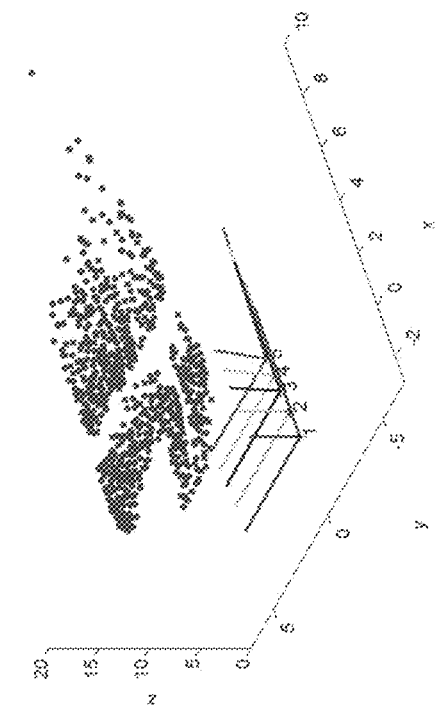
FIG. 28(b) combined 3D structure
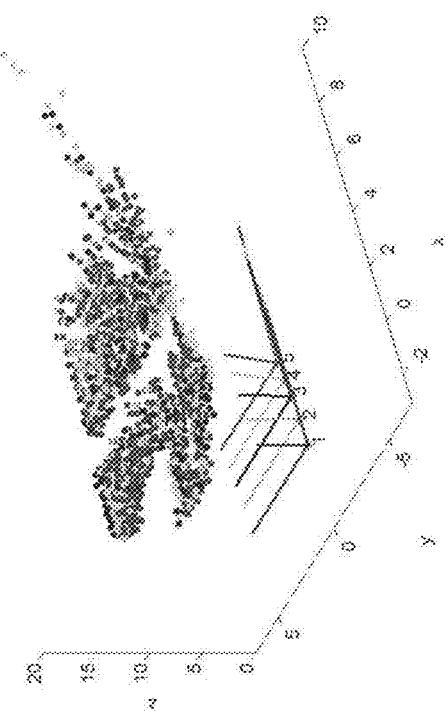
FIG. 28(a) 3D structures for 5 frames

FIG. 29
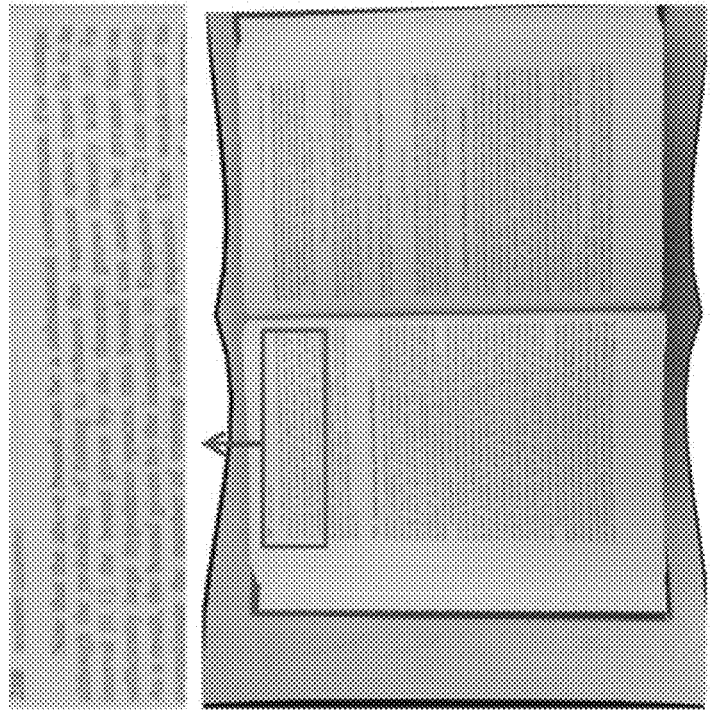
Curved page captured with iPhone4S
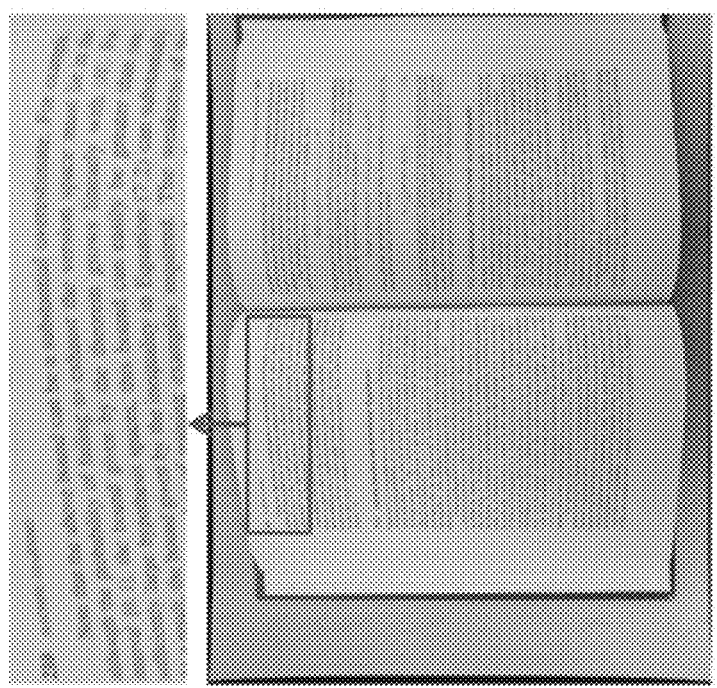
After the proposed dewarping technique

GENERATING HI-RES DEWARPED BOOK IMAGES

CROSS-REFERENCE TO RELATED APPLICATION

This application is a Divisional of U.S. patent application Ser. No. 13/690,564, filed on Nov. 30, 2012, which is based on and claims the benefit of priority under 35 U.S.C. 119 from provisional U.S. patent application No. 61/611,434, filed on Mar. 15, 2012.

BACKGROUND

Field

Example embodiments described herein are generally directed to dewarping, and more specifically, dewarping from use of a stereo camera or a mobile phone camera capturing a sequence of images.

Related Art

In the related art, documents can be "scanned" by utilizing digital cameras or mobile devices to capture images of documents. Compared with flatbed scanners, photos of documents may suffer from various issues including perspective distortion, warping, uneven lighting, etc.

One scenario of interest is to use a handheld consumer-grade compact 3D stereo camera to capture images of page spreads from a document such as a book. For example, a student can use the camera to take notes from books in a library, without having to go to the copy machine and potentially damage the book spines during the copying process. Another example is the digitization of documents in storage, in which bounded or loose paper records are often not in condition to be used with flat-bed or V-bed book scanners without incurring damage. Being able to use the compact cameras on-site is another benefit.

In related art implementations for non-3D capture and dewarping of book page images, the 3D information is computed by detecting curved text lines or other content features, and the dewarping is based on models including the cylinder model.

For 3D capture, related art implementations utilize structured light and multiple cameras. Structured light can sense highly accurate 3D information; however, related art systems utilizing structured light may require extensive hardware. The multiple camera (including stereo camera) approach of the related art can be implemented in a less complex system, but may not be as robust due to the dependence on the page areas containing visible text content or texture.

Some dewarping methods in the related art that have been used with structured light include energy minimization and conformal mapping. However, such related art implementations may require highly accurate 3D information and may thereby be difficult to implement with low-cost consumer grade stereo cameras. Such related art systems utilize a stereo capture system that uses special apparatus with left and right light sources, or a conformal method applied in a stereo system without structured light.

It would also be advantageous to use devices, such as a mobile phone camera, which may be more commonly available than a handheld consumer-grade compact 3D stereo camera, to capture images of page spreads.

SUMMARY

Aspects of the present application include a method, which may involve receiving a stereo photo of at least one document page; computing a model of the at least one document page by generating a cylindrical three dimensional geometric surface from the stereo photo; and rendering a dewarped image from the computed model.

Aspects of the present application further include a computer readable storage medium storing instructions for executing a process. The process may include receiving a stereo photo of at least one document page; computing a model of the at least one document page by generating a cylindrical three dimensional geometric surface from the stereo photo; and rendering a dewarped image from the computed model.

Aspects of the present application further include a device, which may include a camera configured to receive a stereo photo of at least one document page; and a processor configured to compute a model of the at least one document page by generating a cylindrical three dimensional geometric surface from the stereo photo; and render a dewarped image from the computed model.

Aspects of the present application further include a mobile device, which may include a camera configured to capture a sequence of image frames of at least one document page; and a processor configured to compute a disparity map using the captured sequence of image frames; compute a model of the at least one document page by generating a cylindrical three dimensional geometric surface using the computed disparity map; and render a dewarped image from the computed model.

Aspects of the present application further include a method, which may include capturing a sequence of image frames of at least one document page; computing a disparity map using the captured sequence of image frames; computing a model of the at least one document page by generating a cylindrical three dimensional geometric surface using the computed disparity map; and rendering a dewarped image from the computed model.

Aspects of the present application further include a computer readable storage medium storing instructions for executing a process, wherein the process may include: computing a disparity map using a sequence of image frames of at least one document page; computing a model of the at least one document page by generating a cylindrical three dimensional geometric surface using the computed disparity map; and rendering a dewarped image from the computed model.

BRIEF DESCRIPTION OF THE DRAWINGS

FIG. 1 illustrates an example 3D stereo camera.

FIGS. 6(a) and 6(b) illustrate quadrilateral meshes before processing and after processing, respectively, in accordance with an example embodiment.

FIGS. 8(a) and 8(b) shows two visualizations of image differences to illustrate the differences of high resolution rendering, in accordance with an example embodiment.

FIGS. 12(a) and 12(b) illustrates a dewarped image with mesh, in accordance with an example embodiment.

FIG. 27(a) shows an example of an ill-conditioned initial 3D structure consistent with an example embodiment.

FIG. 27(b) shows an example of a well-conditioned 3D structure consistent with an example embodiment.

FIG. 28(a) shows a 3D point structure for five frames consistent with an example embodiment.

FIG. 28(b) shows a combined 3D structure consistent with an example embodiment.

FIG. 29 shows an example of before/after a dewarping technique consistent with an example embodiment.

DETAILED DESCRIPTION

Figure 2B:
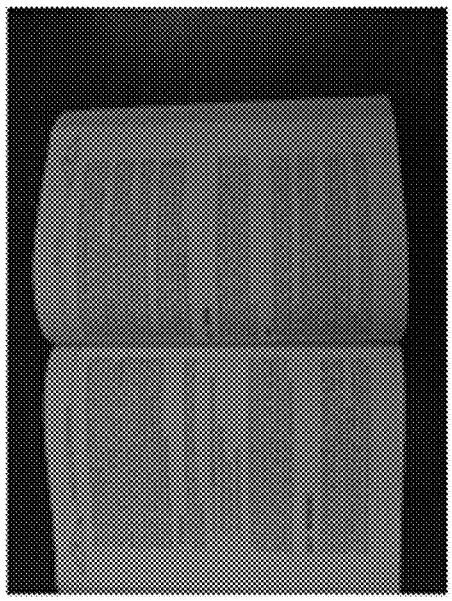
FIG. 2(a) to 2(c) illustrate a stereo pair captured by a 3D camera and flattened by dewarping, in accordance with an example embodiment.

Example embodiments described herein are directed to a system for capturing images of documents such as book page spreads with a handheld consumer-grade compact 3D stereo camera, and for performing dewarping to produce output images that are flattened. Parts of the processing pipeline may employ computer vision algorithms for stereo imaging, such as OpenCV.

In the related art, only low-res (3 MP) images can be successfully processed for stereo imaging, whereas the camera is capable of capturing hi-res (10 MP) images. However, example embodiments described herein utilize a quadrilateral mesh with identifiable vertices which are processed by the low-res parts of the pipeline and then used to facilitate rendering of the hi-res dewarped image, to utilize hi-res images. The example embodiments may thereby utilize a multi-resolution pipeline for a 3D document capture system, and may be used in conjunction with optical character recognition (OCR) applications.

The example embodiments may utilize a three dimensional geometric surface (e.g. cylindrical surface) to generate the model using stereo 3D information without requiring the use of text line or other content analysis. This allows the example embodiments to process one or more pages that include figures and pictures.

Related art cylinder model approaches may utilize two cameras. The camera positions of the related art solutions are not fixed, and may be more complicated than a stereo system with fixed cameras (which can be calibrated). Such related art systems use feature points such as scale invariant feature transforms (SIFT) and bundle adjustment for computing the 3D data, and perform curve fitting as an optimization problem on all points measured. The related art may require high end digital single lens reflex (DSLR) cameras with large sensors for implementation.

In contrast, example embodiments use camera calibration and block matching, and compute a depth map and compute profiles to model the cylinder, which allows compact consumer grade stereo camera with small sensors to be utilized instead of high end DSLR cameras.

One problem of the related art is that some parts of the processing pipeline that employ standard computer vision algorithms (e.g. in OpenCV), can only process images captured at the low-res (e.g. 3 MP) setting of the camera can be successfully processed, whereas the camera is capable of capturing quality images at the hi-res (e.g. 10 MP) setting. For OCR applications, the low resolution dewarped images may perform worse than the non-dewarped images. Example embodiments therefore generate high resolution dewarped images to improve OCR performance.

Example embodiments also simplify camera calibration, which can be done once for use at multiple resolution camera settings (e.g. low, medium, high).

Example embodiments are also directed to a multi-resolution pipeline in a 3D document capture system. In implementations of example embodiments, a quadrilateral mesh with identifiable and detectable vertices is utilized after being processed by pipeline algorithms directed to low resolution images. The processed mesh is then used to interpolate and render a higher resolution version of the low resolution image as if the image had been successfully processed.

FIG. 1 illustrates an example 3D stereo camera to capture images of one or more pages (e.g., from a document such as a book). Such cameras may have two lenses 100, 101 to capture a 3D photo comprising a pair of left and right images. The stereo camera may have two image sensors inside mounted in a fixed position, which allows for camera calibration with OpenCV. One example of such a 3D stereo camera is the Fujifilm FinePix W3, however, example embodiments are not limited to this configuration.

Figure 2A:
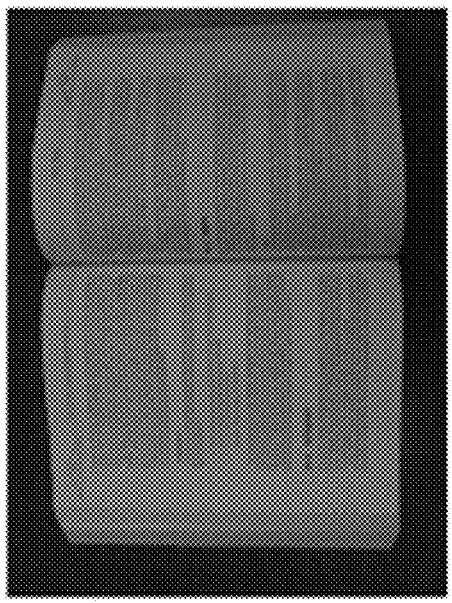
Figure 2C:
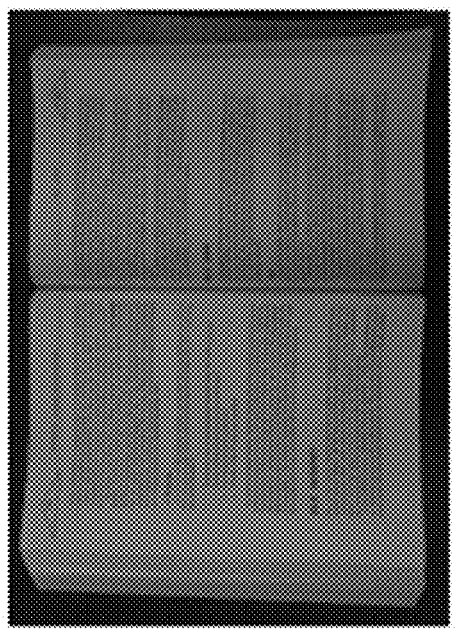

FIG. 2(a) to 2(c) illustrate a stereo pair captured by a 3D camera and flattened by dewarping, in accordance with an example embodiment. Using a stereo camera, a pair of images is captured (e.g. left image as shown in FIG. 2(a) and right image as shown in FIG. 2(b)), wherein example embodiments render a flattened image by dewarping as shown in FIG. 2(c).

Figure 3:
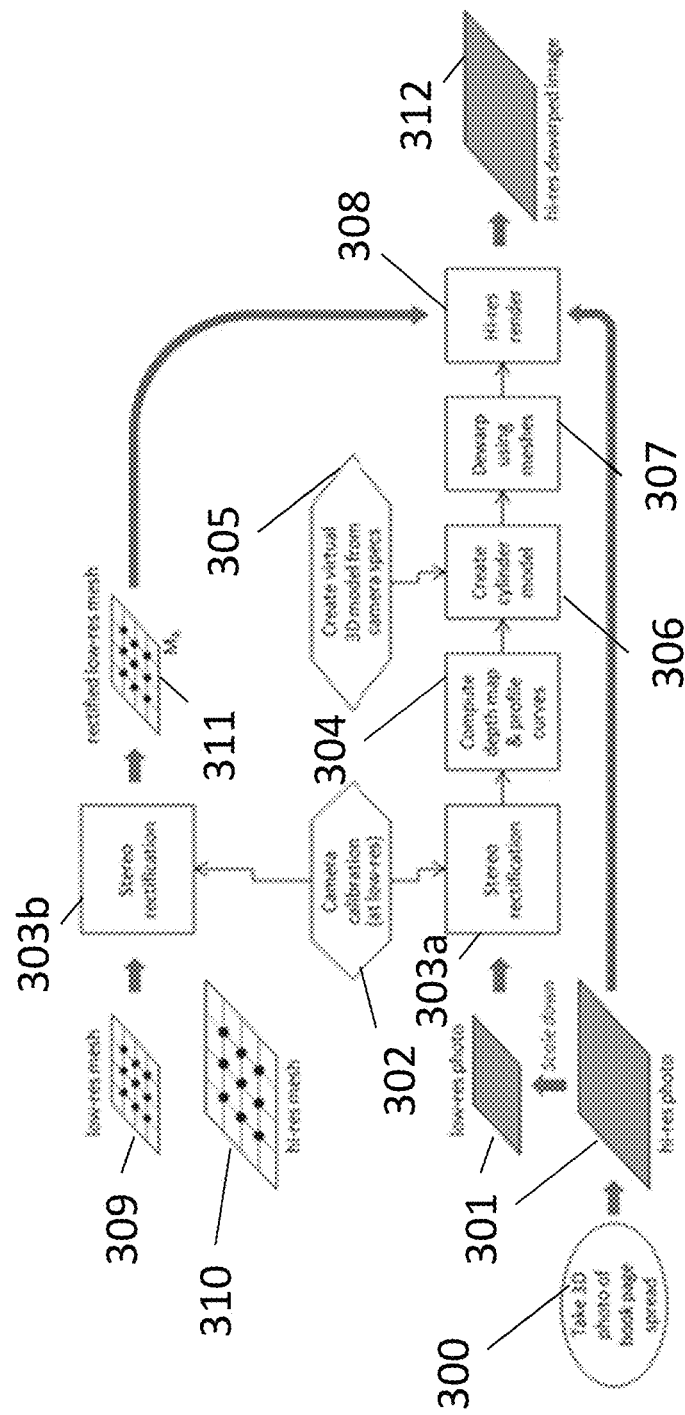
FIG. 3 illustrates a flowchart overview, in accordance with an example embodiment.

FIG. 3 illustrates a flowchart overview, in accordance with an example embodiment. In the example of FIG. 3, a user takes a 3D photo (e.g. stereo image) of a document such as a book page spread in high resolution at 300. At 301, a lower resolution image of the 3D photo is generated from the high resolution photo for rectification. For example, when the 3D photo of a document such as a book is taken at the high resolution setting (e.g. 10 MP), the pair of images from the 3D photo can be scaled down to low resolution (e.g. 3 MP) and processed accordingly. At 302, the camera may recalibrate based on the low resolution image, so that stereo rectification can be conducted on the low resolution photo as shown at 303a, and so that a low resolution mesh 309 can also be stereo rectified as shown at 303b, to produce a rectified low res mesh 311. The low resolution mesh 309 may be derived from lowering the resolution of a high resolution mesh 310 derived from the high resolution photo. The rectification, which in the context of stereo cameras means transforming the images so that they are horizontally aligned, may be performed on each pair of stereo photos. Rectification algorithms such as OpenCV may be used to conduct the rectification.

At 304, the depth map and profile curves of the rectified low resolution image may then be calculated. For example, to compute a depth map from the rectified stereo images, which recovers the depth information, block matching may be utilized. Depth map algorithms from OpenCV or other similar algorithms may be used to provide the depth information.

At 305, a virtual 3D model is generated based on the specification of the camera. The virtual 3D model may be used to create a three dimensional surface model for interpolating the low resolution photo, such as a cylinder model, as shown at 306. Further detail about the surface model and the cylinder model are described in FIG. 9.

At 307, dewarping can be conducted from the meshes and the generated three dimensional surface model. Further details are provided in the description of FIG. 4. At 308, a high resolution rendering of a dewarped image can then be conducted based on the high resolution photo, the rectified low resolution mesh and the dewarping of the low resolution photo to render a dewarped representation of the high resolution photo.

The 3D photo of the book is taken at the hi-res setting (10 MP). The pair of images from the 3D photo is scaled down to low-res (3 MP) and processed through the pipeline shown in FIG. 3 until the Hi-res render 308.

Figure 4:
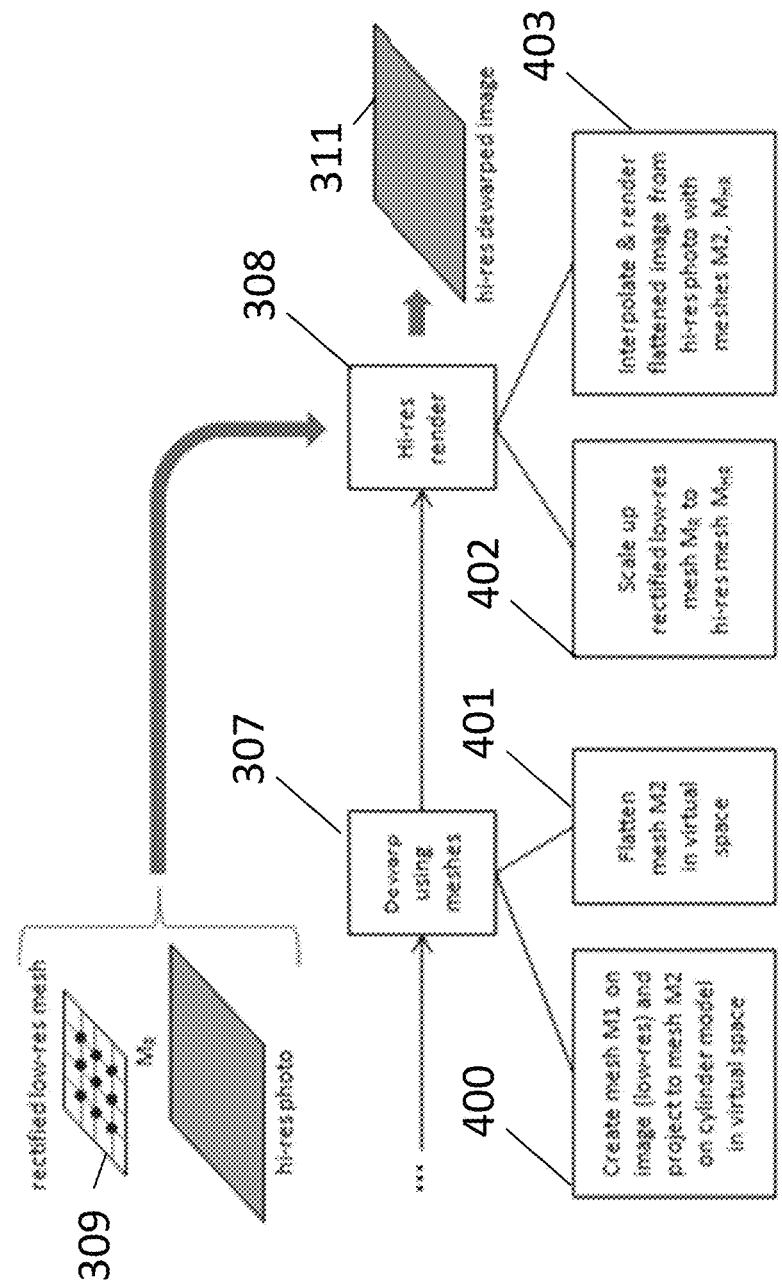
FIG. 4 illustrates a flowchart overview for generating a high resolution dewarped image, in accordance with an example embodiment.

FIG. 4 illustrates a flowchart overview for generating a high resolution dewarped image, in accordance with an example embodiment.

Figure 5:
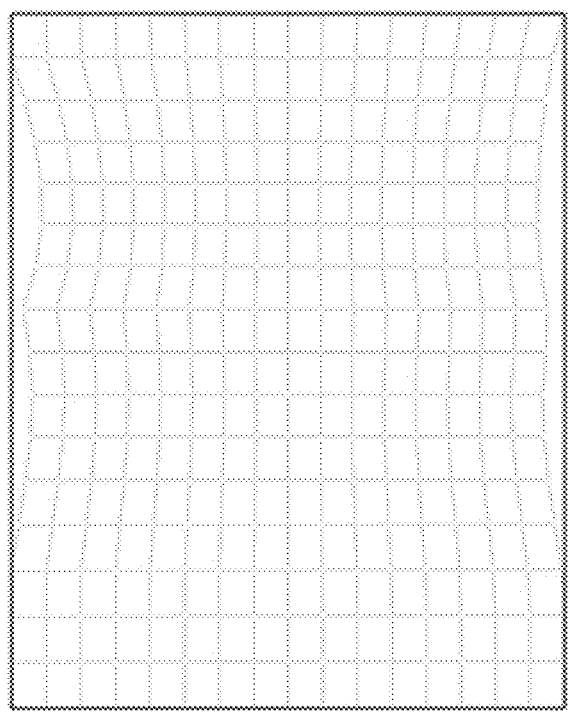
FIG. 5 illustrates a flattened mesh in accordance with an example embodiment.

As illustrated in FIG. 3, a dewarp using meshes 307 is conducted before the high resolution render 308. To dewarp using meshes, a quadrilateral mesh M1 with regularly spaced vertices in a rectangular grid is fitted to the size of the low resolution photo, and projected to the mesh M2 on the cylinder model in virtual 3D space determined by the camera specifications as shown at 400. Then the mesh M2 on the cylinder is geometrically flattened in the virtual space as shown at 401. An example of a flattened mesh M2 is illustrated in FIG. 5, which illustrates a flattened mesh for the stereo pair as shown in FIGS. 2(a) and 2(b).

For the high resolution render 308, the flattened mesh M2, the hi-res photo, and the processed quadrilateral mesh MR are utilized. The construction of MR and the details of the Hi-res render 308 are explained in the following sections. Finally, the output of the Hi-res render 308 is the hi-res dewarped image 312.

For constructing the processed quadrilateral mesh, the quadrilateral mesh needs to be processed only once for each camera device; and utilizes the camera calibration parameters computed for the camera at the low resolution setting to generate the mesh. Starting with a low-res quadrilateral mesh with vertices in a regularly spaced rectangular grid pattern, the processing yields the rectified low-res mesh MR. An example of a processed mesh is illustrated at FIG. 6(b) as derived from FIG. 6(a).

Figure 7A:
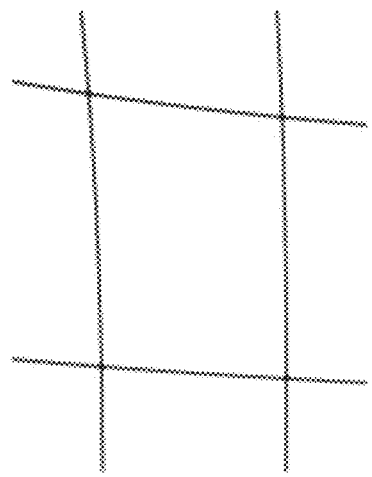
FIGS. 7(a) and 7(b) illustrate a mesh with black lines and bolded dots at the intersections before processing and after processing, respectively, in accordance with an example embodiment.
Figure 7B:
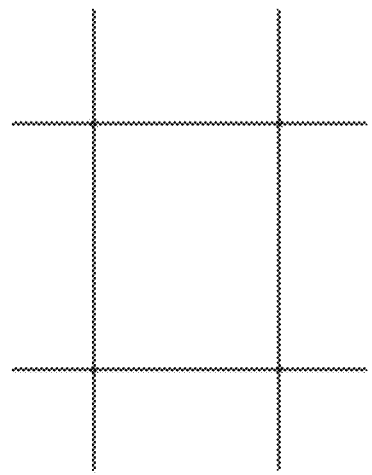

One way to determine the locations of the vertices of the processed quadrilateral mesh is to use a mesh that has identifiable vertices; for example, by coloring them (e.g. red) or by adding texture or other distinguishing features (e.g. bold dots). These vertices can then be detected in the processed mesh, and their relative locations within the mesh are determined as the lens distortion is minor (see FIG. 6(b)). Even for the cases where the lens distortion is high (e.g. very wide-angle lens), the vertices can be colored by two or more colors in an alternating pattern or different sizes of bold dots to disambiguate neighboring vertices in the processed image. FIGS. 7(a) and 7(b) illustrates an example of a mesh with bold dots before (FIG. 7(a)) and after (FIG. 7(b)) processing.

During the high resolution processing 308, the processed low-res mesh MR is scaled up to a hi-res size mesh MHR as shown at 402. By fitting another regularly spaced high resolution mesh MS to the high resolution photo, a correspondence can be made from each rectangular cell in MS to a processed quadrilateral cell in MHR. A cell-by-cell correspondence from the mesh MHR to the flattened mesh M2, resulting in a chain of correspondences from MS to MHR to M2. Each pixel in the output flattened image determined by M2 can be backward interpolated through the chain to the hi-res photo with mesh MS, as shown at 403.

The cells in the flattened mesh M2 are warped rectangles, and the rendering is performed individually for each warped rectangle wi. To simplify the traversal over the pixels in wi, the subset of pixels in the target dewarped image that are in the bounding box of wi are considered and these pixels are traversed row-by-row inside this rectangular bounding box. A pixel p is checked to see if it is contained in wi; if not, pixel p is ignored and the next pixel can be traversed.

To interpolate a pixel p inside a warped rectangle wi, the pixel is projected onto each pair of opposite edges to obtain a projection point pj (j=1, 2, 3, 4) on each of the four edges. This is computed first by finding the intersection of the lines that coincide with a pair of edges. Then the line determined by this intersection point and the point p will intersect the opposite edges, and these are taken to be the projection points for that pair of edges. In the case when a pair of opposite edges is parallel, the perpendicular line that passes through p is considered, and this perpendicular line will then intersect the edges at the projection points.

Once the projection points are obtained, example embodiments may proceed as follows. A projection point pj on each edge breaks the edge into two sub-segments with a certain ratio α. Back on the corresponding rectangular cell in MHR for the source image, the point pj* on the corresponding edges with the same ratio α are found for each edge. The pj*'s on opposite sides of the rectangle determine a line. There may be two such lines, and their intersection point p* inside the rectangle is taken to be the point that corresponds to the pixel p inside the warped rectangle wi. Since p* does not map precisely to the location of a single pixel on the source image, the value is interpolated by using the nearby pixels. One way to interpolate is to take a weighted average of the adjacent pixels with the weights based on the distance to each pixel.

FIGS. 8(a) and 8(b) shows two visualizations of image differences to illustrate the differences of high resolution rendering, in accordance with an example embodiment. Specifically, the image difference between non-processed (FIG. 8(a)) versus generated by applying a processed quadrilateral mesh (FIG. 8(b)) is illustrated. Images have been cropped to show more detail, with the bottom row illustrating close-ups of the images in the top row. As shown in FIG. 8(a), if the flattened image is rendered directly from MS without going through the processed mesh MHR, the pixels would come from the wrong locations as shown by the misalignments. In the second visualization as shown by the column of FIG. 8(b), the difference between a low resolution processed image and a high resolution processed image is illustrated; the two images are aligned and there is a difference mostly around the contours of the characters.

The high resolution rendering and multi-resolution processing differs from the low resolution rendering and single resolution processing in that a high resolution processed mesh MHR is created. This mesh enables the pixels in the high resolution target image to be interpolated from the high resolution source image. To create mesh MHR, a processed mesh MR is constructed from a low resolution rectangular mesh. The cell-to-cell interpolation and rendering is independent of the resolution and works the same way for the low resolution and high resolution cases.

Figure 9:
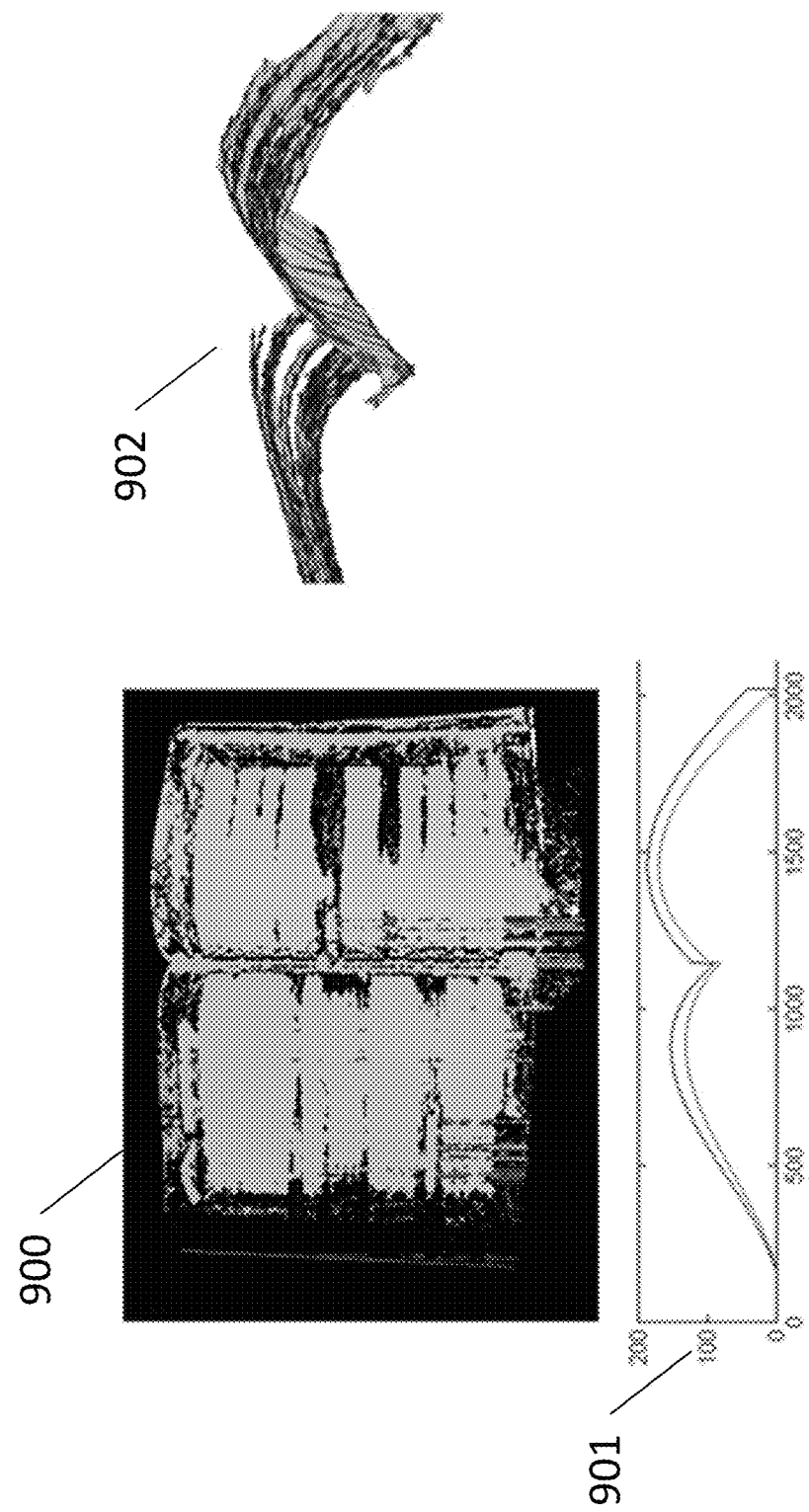
FIG. 9 illustrates a segmented depth map, bottom and top curve profiles, and triangulated point cloud, in accordance with an example embodiment.

FIG. 9 illustrates a segmented depth map, bottom and top curve profiles, and triangulated point cloud, in accordance with an example embodiment.

To compute the depth map and profile curves as shown at 304 in FIG. 3, segmentation may be performed to isolate the one or more document pages within the depth map image. The segmented depth map of the stereo photo as shown in FIG. 2(a) and FIG. 2(b) is shown at 900.

To compute the curve profiles of the depth map, implementations of example embodiments may take horizontal sections of the depth map and compute the average depth at each x position. The profiles are then modeled by detecting the location of the book spine and by using cubic polynomials to fit the profiles on each side of the spine. For constructing a three dimensional surface model (e.g. cylinder model) two profiles are computed by using the top half of the depth map and the bottom half, as shown at 901. The profiles are assigned y positions at ¼ and ¾ of the image height, respectively.

Reference element 902 illustrates the triangulated point cloud corresponding to the depth map. As the point cloud 902 illustrates, the 3D information obtained from the pipeline using the algorithms in OpenCV described above does not provide sufficiently clean or accurate data to reconstruct the page directly. Therefore, a three dimensional surface model is used to parameterize the one or more paper pages, which can be considered as rigid ruled surfaces. In an example implementation, a cylinder model is used, although other surface models may also be used to model the documents or the book.

Note that in this field of study, "cylinder model" (or "cylindrical model") has a more general meaning than in everyday usage of the term, in that the top and bottom boundary curves can be of different shape and not limited to a circular arc shape.

In example implementations, two curve profiles from the depth map, and the depth value of a point Pic(xic, yic) on the rectified photo can be interpolated by the depth values at (xic, ¼×height) and (xic, ¾×height) on the two curve profiles. An additional refinement may be added to estimate the slight angle correction caused by the tilt of the camera. With the interpolated depth value z, the point P(x, y, z) can be determined on the surface in world coordinates using a camera model based on the camera's hardware specifications.

Figure 10:
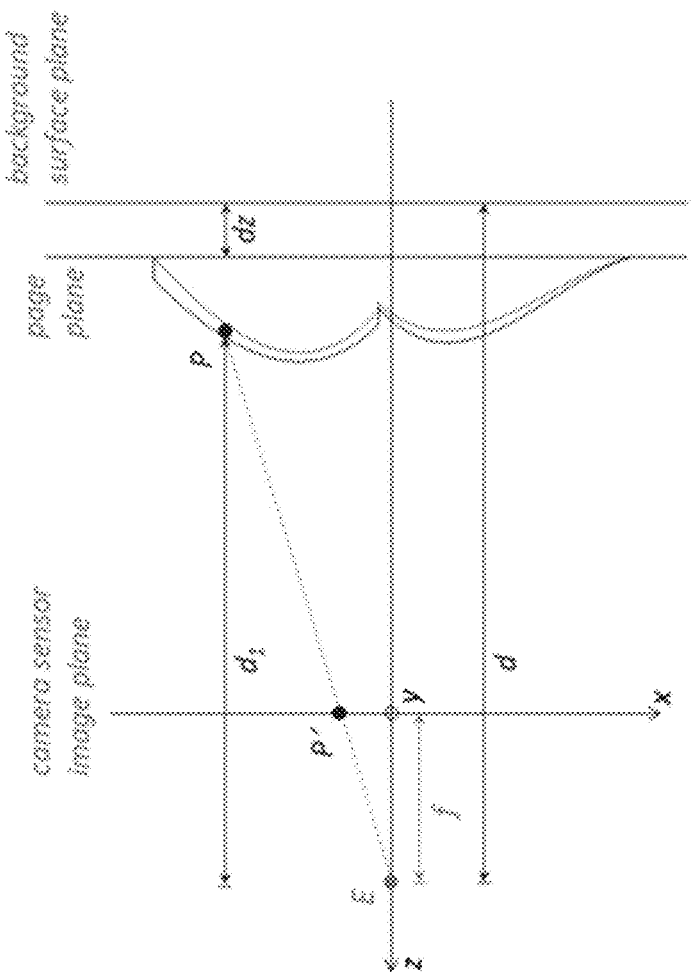
FIG. 10 illustrates a camera model, in accordance with an example embodiment.

FIG. 10 illustrates a camera model, in accordance with an example embodiment. From the camera specifications, the sensor width and height, and the focal length f can be obtained. (The focal length can also be extracted from the photo's EXIF data.) There are two parameters that depend on the context when taking a photo of a document such as a book. One is the distance d from the camera to the background surface plane (e.g. a table) and the other is the thickness dz of the book between the background and the one or more pages being captured. Since it may be inconvenient for the user to measure these during the capture step, these parameters can be estimated and adjusted during processing.

From the camera model, given a 2D point Pic(xic, yic) in the rectified photo image coordinates and the computed depth value z, the corresponding 3D point P(x, y, z) can be computed in the virtual world space of the camera model as follows. The photo image coordinates are converted to image sensor world coordinates Pwc(xwc, ywc), and the depth value is also converted to world coordinates zwc. Using trigonometry as shown in FIG. 10, the point P(x, y, z) can be determined on the surface in world coordinates.

Figure 11:
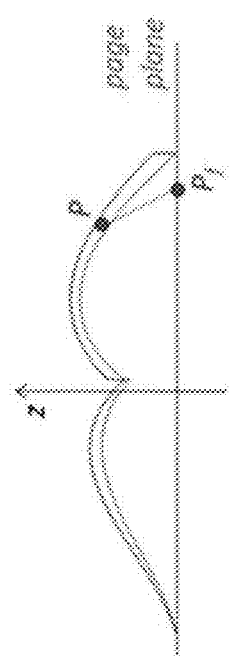
FIG. 11 illustrates flattening the surface based on arc-length, in accordance with an example embodiment.

Next, the surface (e.g., cylindrical in this example) can be flattened based on the arclength to obtain a point Pf(xf, yf, zf) on the page plane, as illustrated in FIG. 11. More precisely, the arclength of the curve profile can be computed from x=0 to P, and this arclength will be the magnitude of xf. Finally, Pf can be converted to a point Pfic in the output image coordinates by scaling the page plane coordinates.

Once the conversion and transform of one point Pic to Pfic is determined, a rectangular mesh can be constructed and applied to facilitate the transformation of the whole image. Each mesh point from the rectified input photo image is mapped to a point on the flattened output image, and the points inside the sub-rectangles can be interpolated from the corresponding mesh rectangles. As noted above, FIG. 5 illustrates the flattened mesh of the input stereo pair of FIGS. 2(a) and 2(b).

FIGS. 12(a) and 12(b) illustrate a dewarped image with mesh, in accordance with an example embodiment. FIG. 12(a) shows the dewarped image with its mesh, and FIG. 12(b) is a close up view. The final rendering result from the mesh is shown in FIG. 2(c).

Figure 13:
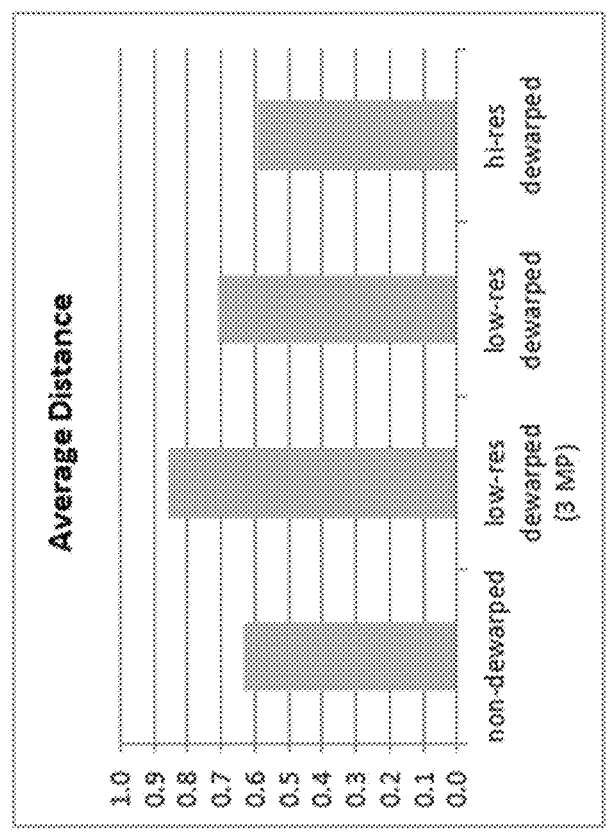
FIG. 13 illustrates a standard error comparison of average distances for various implementations, including an implementation of exemplary embodiments.

FIG. 13 illustrates a standard error comparison of average distances for various implementations, including an implementation of an exemplary embodiment. For the comparison, an evaluation was conducted based on OCR. Six images of book page spreads were taken with a handheld camera. The boundary text lines on the two pages in each page spread were examined: {top-left, top-right, bottom-left, bottom-right}. The boundary text line is defined as the text line nearest to the top or bottom of a page that spans more than half the body of the page, so that short lines at the bottom of a paragraph and headers or footers are not considered. The six page spreads provides a total of 24 boundary text-lines.

The implementation of high resolution dewarping performed 17% better than the low resolution dewarping and 7% better than the non-dewarping. The images in the low resolution dewarping are upsampled to the same 10 MP resolution as the high resolution dewarping case. The images in low resolution dewarping (3 MP) case are not upsampled; as if everything in the system were set to 3 MP. In the performance comparison, the low resolution dewarping (3 MP) case was 32% worse the high resolution dewarping.

Figure 14:
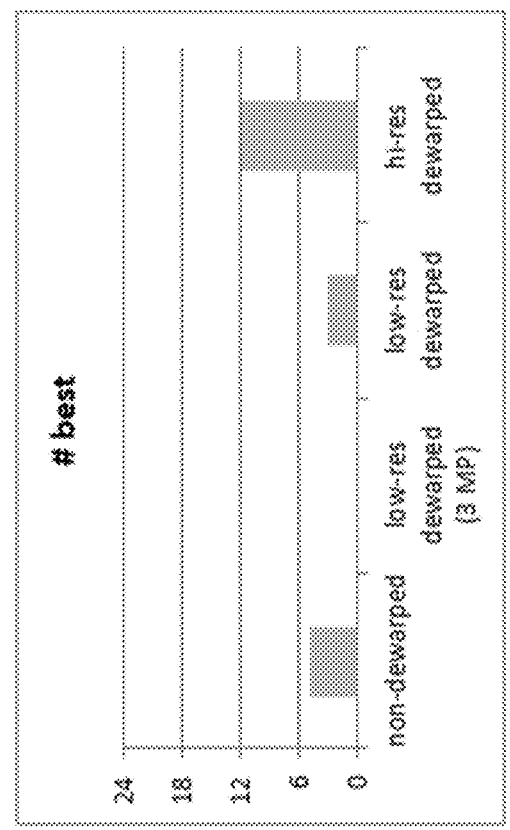
FIG. 14 illustrates standard error results for the test lines, including an implementation of exemplary embodiments.

FIG. 14 illustrates standard error results for the test lines, including an implementation of exemplary embodiments. The number of best scores for the 24 boundary text lines are illustrated. As indicated in FIG. 14, the high resolution dewarping has substantially more best scores than the others.

Figure 15:
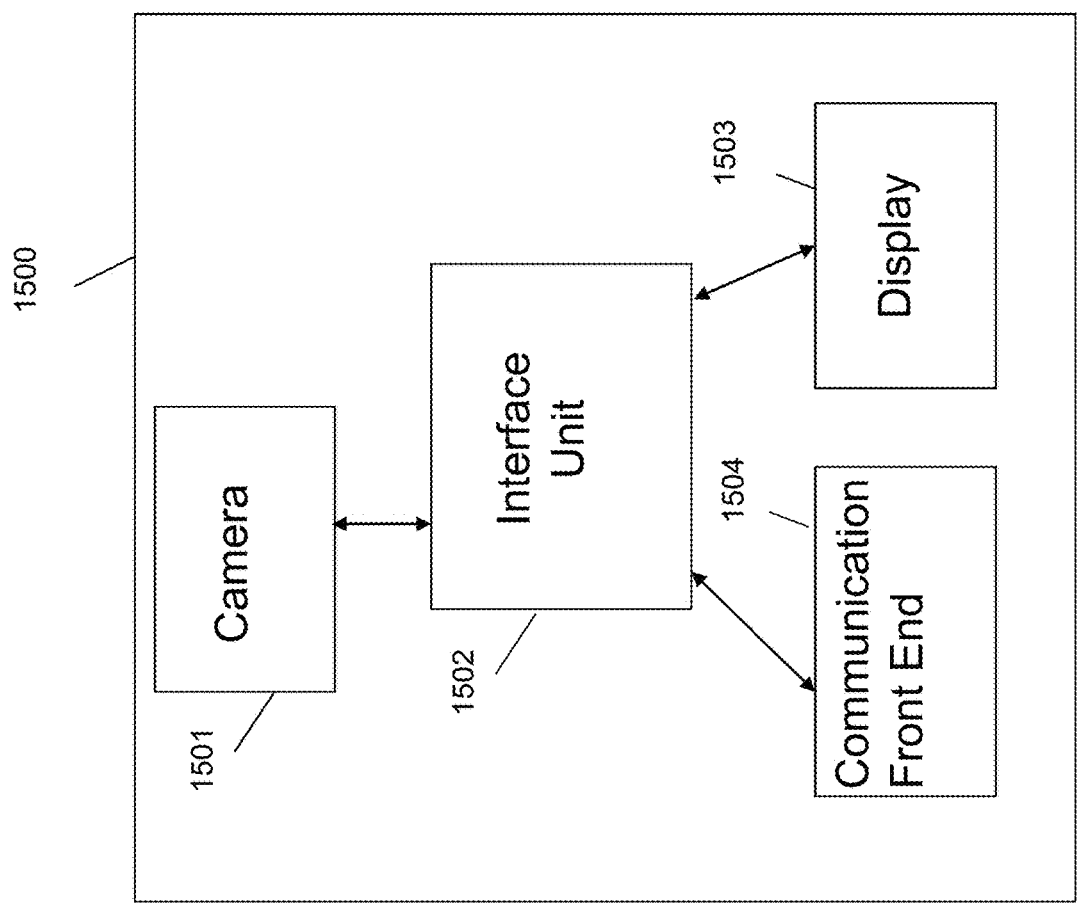
FIG. 15 illustrates an example functional diagram of a device in accordance with an example embodiment.

FIG. 15 illustrates an example functional diagram of a device 1500 in accordance with an example embodiment. A stereo image can be received by a camera 1501, which may be processed by a processor 1502 for generating the high-resolution dewarped rendering as illustrated in FIG. 2(c). The interface unit is executed by one or more processors. The processor interacts with a display 1503 for displaying the interfaces and with a communication front end 1504 for interacting with a server or other devices. The processor may be configured to perform the functions as indicated in FIG. 3.

Figure 16:
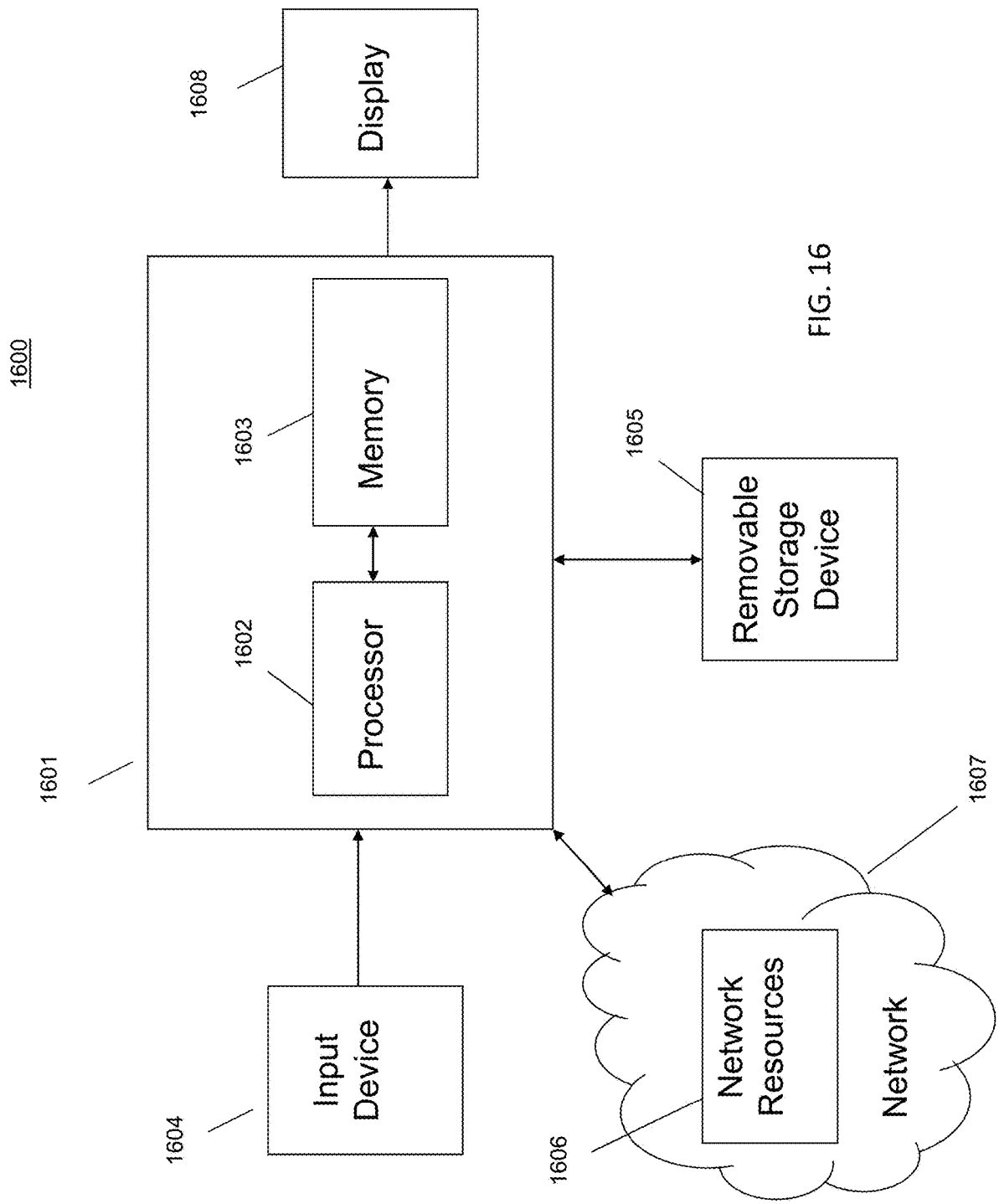
FIG. 16 is a block diagram that illustrates an embodiment of a computer/server system upon which an embodiment of the inventive methodology may be implemented.

FIG. 16 is a block diagram that illustrates an embodiment of a computer/server system 1600 upon which an embodiment of the inventive methodology may be implemented. The system 1600 includes a computer/server platform 1601 including a processor 1602 and memory 1603 which operate to execute instructions, as known to one of skill in the art. The term "computer-readable medium" as used herein refers to any medium that participates in providing instructions to processor 1602 for execution. Such computer readable mediums may include computer readable signal mediums that include transitory signals such as carrier waves, and computer readable storage mediums, which are tangible devices storing instructions, including, but not limited to, Random Access Memory (RAM), Hard Disk Drives (HDD), flash memory, and other tangible storage devices.

Additionally, the computer platform 1601 receives input from a plurality of input devices 1604, such as a keyboard, mouse, touch device or verbal command. The computer platform 1601 may additionally be connected to a removable storage device 1605, such as a portable hard drive, optical media (CD or DVD), disk media or any other medium from which a computer can read executable code.

The computer platform may further be connected to network resources 1606 which connect to the Internet or other components of a local public or private network. The network resources 1606 may provide instructions and data to the computer platform from a remote location on a network 1607. The connections to the network resources 1606 may be via wireless protocols, such as the 802.11 standards, Bluetooth® or cellular protocols, or via physical transmission media, such as cables or fiber optics.

The network resources may include storage devices for storing data and executable instructions at a location separate from the computer platform 1601. The computer interacts with a display 1608 to output data and other information to a user, as well as to request additional instructions and input from the user. The display 1608 may therefore further act as an input device 1604 for interacting with a user.

Additionally, as one possible alternative to using a hand-held consumer-grade compact 3D stereo camera, an example embodiment may employ aspects of an illustrative processing pipeline described above in conjunction with a mobile phone camera to capture images of page spreads. Indeed, mobile phones are compact and widely available. Thus, capturing images with a mobile phone camera may be more convenient than using devices such as specialized flat-bed, V-bed, or 3D capture devices.

A related art device is directed to video mosaicing for document imaging and uses a web-cam and a mobile PC or a desktop PC to capture video of a flat document or a curved book page spread. The web-cam has low resolution (VGA or 0.3 MP) at about 6 fps to 8 fps. However, with such low resolution, the user must sweep over the document in a back-and-forth path in order to cover the document and mosaicing is necessary to reconstruct an image of the whole document. Further, the aforementioned related art device uses a structure from motion (SfM) technique that employs bundle-adjustment to minimize the re-projection errors.

In contrast to such a related art device, using a hi-res system according to an example embodiment, the user can make a simple linear path across the document, mosaicing is not necessary, and OCR can be performed. An example embodiment can also work at a lower frame rate (e.g., 1 fps). Unlike related art devices which use Harris corner feature points, an example embodiment may use GoodFeaturesTo-Track keypoints. In further contrast to related art devices that use a SfM technique that employs bundle-adjustment to minimize the re-projection errors, an example embodiment employs two techniques that are simpler and require less computation: optical flow and/or SfM with averaging.

Another related art device uses a video camera mounted over the user's desk and provides functions such as the capture of text segments. However, the aforementioned related art device works on flat documents and does not handle curved documents like books. Further, the aforementioned related art device has a camera with low resolution (VGA or 0.3 MP) and uses super-resolution to enhance the images. According to the aforementioned related art device, an OCR evaluation using simulated images that were artificially degraded (not actual camera images) is performed.

Figure 17:
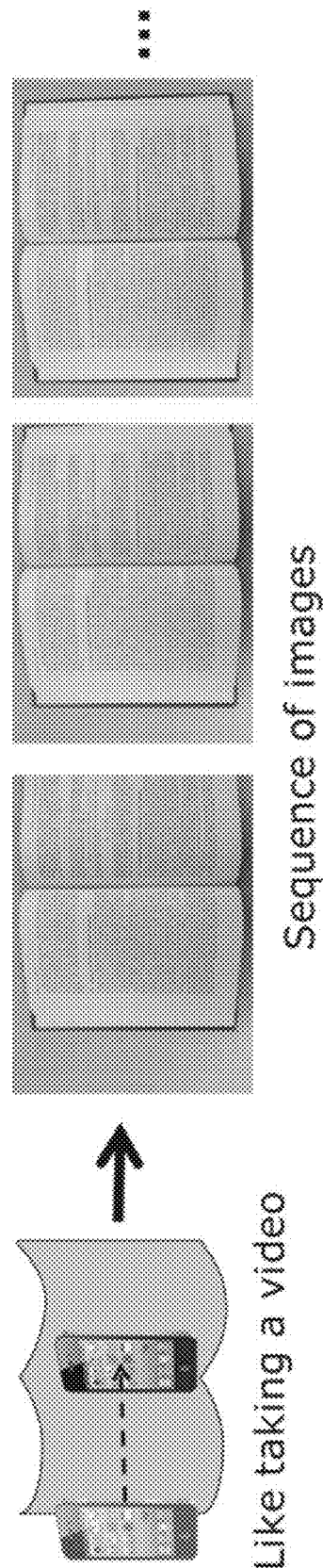
FIG. 17 illustrates a method of using a mobile phone camera to capture a sequence of images in accordance with an example embodiment.

In sharp contrast to such related art devices, as shown in FIG. 17, according to an example embodiment, as the mobile phone camera is swept over the page, a sequence of images is captured using a procedure similar to taking a video. Methods such as optical flow or structure from motion may then be used to compute the disparity maps of each image frame. Using this disparity map, an example embodiment may dewarp each image frame using a cylindrical model constructed from depth profiles, using aspects of an illustrative processing pipeline described in detail above.

According to an example embodiment, a mobile phone camera having high quality resolution (8 MP) may be used, however, embodiments are not limited to such a configuration. Further, a mobile application (or mobile app) designed to run on the mobile phone may be employed to capture a sequence of frames (8 MP).

Using a mobile phone camera makes an example embodiment widely applicable. However, example dewarping methods described above require 3D depth information. As discussed in greater detail below, once 3D disparity maps can be computed when using a mobile phone camera to capture a sequence of images, the example dewarping methods described above can be leveraged.

Figure 18:
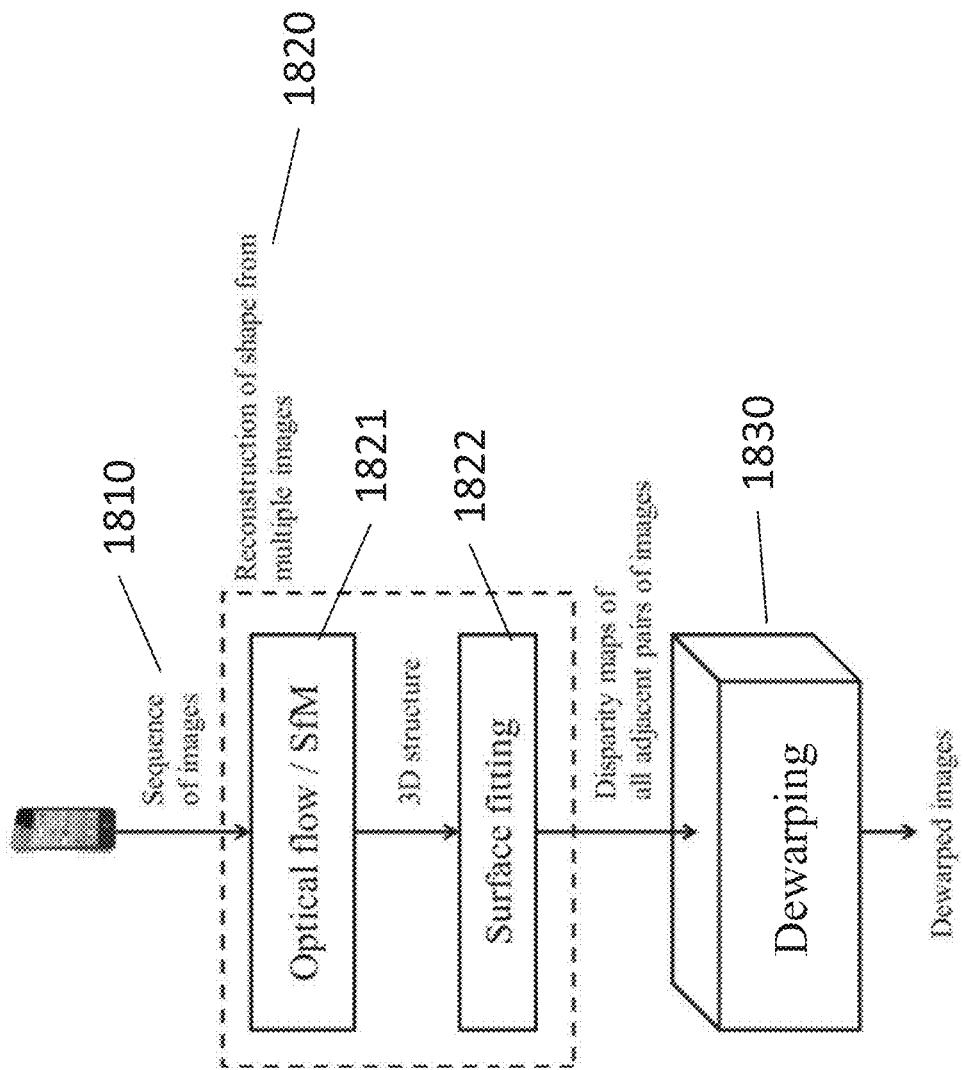
FIG. 18 is a flowchart depicting an overview of a pipeline for an example embodiment using a mobile phone camera to capture a sequence of images.

A flowchart depicting an overview of a pipeline for an example embodiment using a mobile phone camera to capture images of page spreads is shown in FIG. 18. As shown in FIG. 18, at 1810, a mobile phone camera captures a sequence of images. At 1820, the shape of the page spread is reconstructed from the captured multiple images. Specifically, at 1821, 3D disparity maps are computed using optical flow and/or SfM techniques, which are two related techniques that rely on tracking keypoints in the captured image frames. With the optical flow technique, a single pair of adjacent frames is used to compute a disparity map. On the other hand, with the SfM technique, a consistent coordinate system is used to compute all the disparity maps.

According to an example embodiment, in both the optical flow and the SfM techniques, the keypoints that are tracked are GoodFeaturesToTrack keypoints. Another option for keypoints is SIFT, however, SIFT points are not specifically designed to be tracked like the GoodFeaturesToTrack keypoints. According to an example embodiment, camera calibration for the mobile phone camera is also performed. Algorithms for GoodFeaturesToTrack keypoints and camera calibration are available in the OpenCV computer vision library.

At 1822, a surface fitting algorithm is performed and disparity maps of all adjacent pairs of images are generated. Finally, at 1830, dewarping is performed to generate dewarped images.

Figure 19:
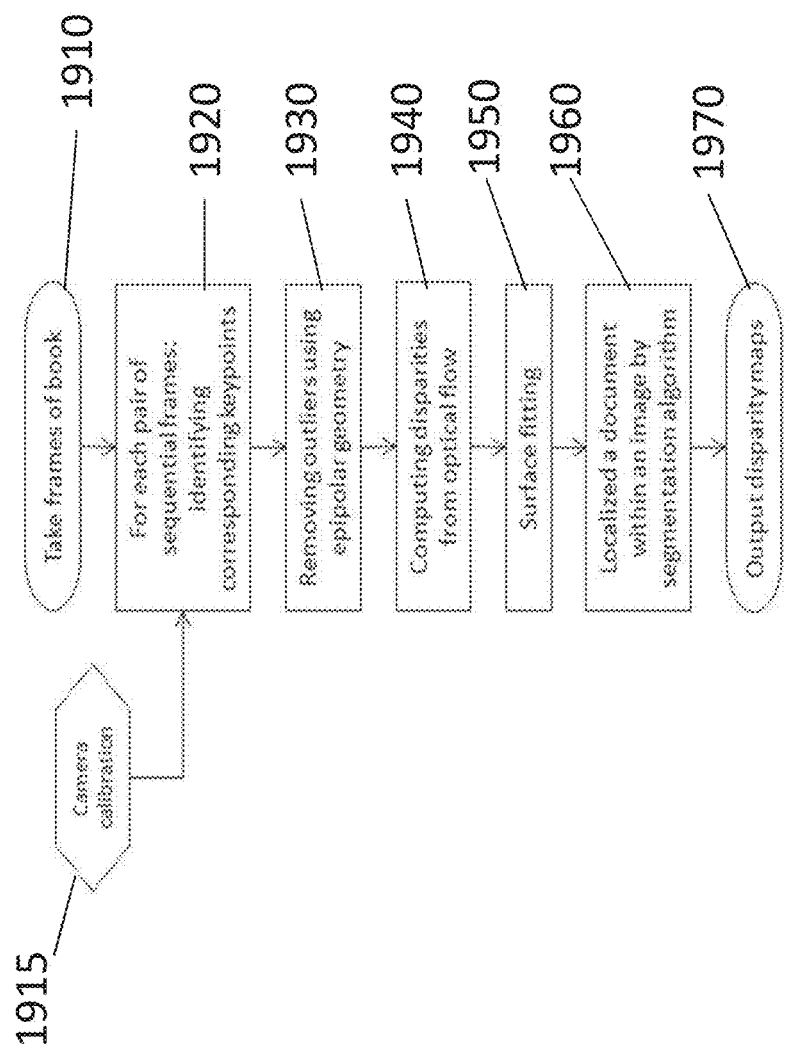
FIG. 19 provides a flowchart showing an overview of an optical flow technique according to an example embodiment.
Figure 20:
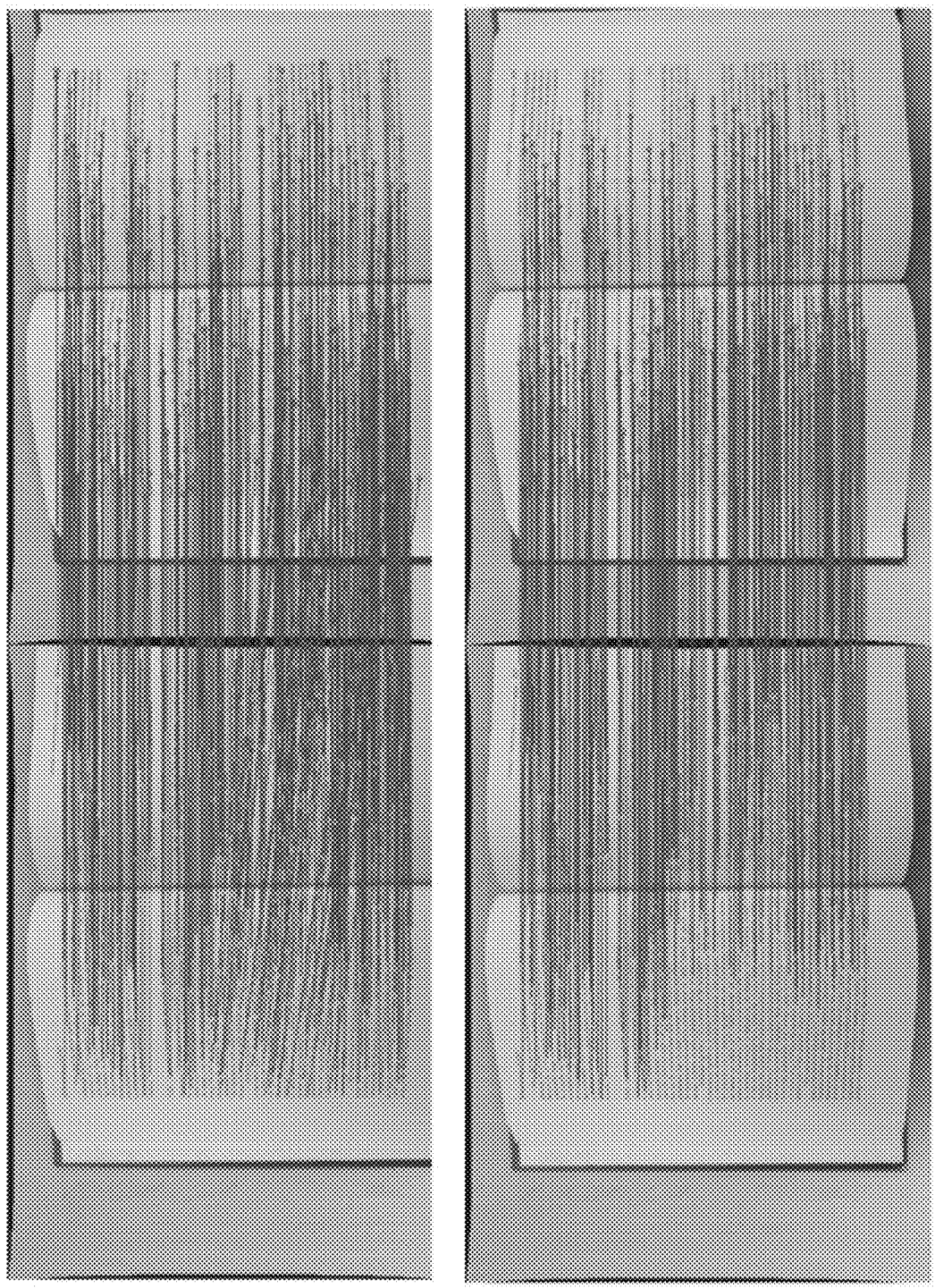
FIG. 20 illustrates identifying the corresponding keypoints in a pair of sequential frames according to an example embodiment.

FIG. 19 provides a flowchart showing an overview of an optical flow technique according to an example embodiment. At 1910, a mobile phone camera captures a sequence of images of a document such as a book. At 1915, camera calibration for the mobile phone camera is performed. At 1920, for each pair of sequential frames, corresponding keypoints are identified. To find the corresponding keypoints in a pair of sequential frames, the Optical flow (OpenCV) matching method is used. An example of identifying the corresponding keypoints points is shown in FIG. 20.

At 1930, the outliers are removed using epipolar geometry between two frames, which is described as in the following equation:

$$x_2^T F x_1 = 0$$

In the above equation, F is the fundamental matrix, $x_1$ and $x_2$ are homogeneous coordinates of the projected points of 3D point X onto the first and second image plane respectively.

Figure 21:
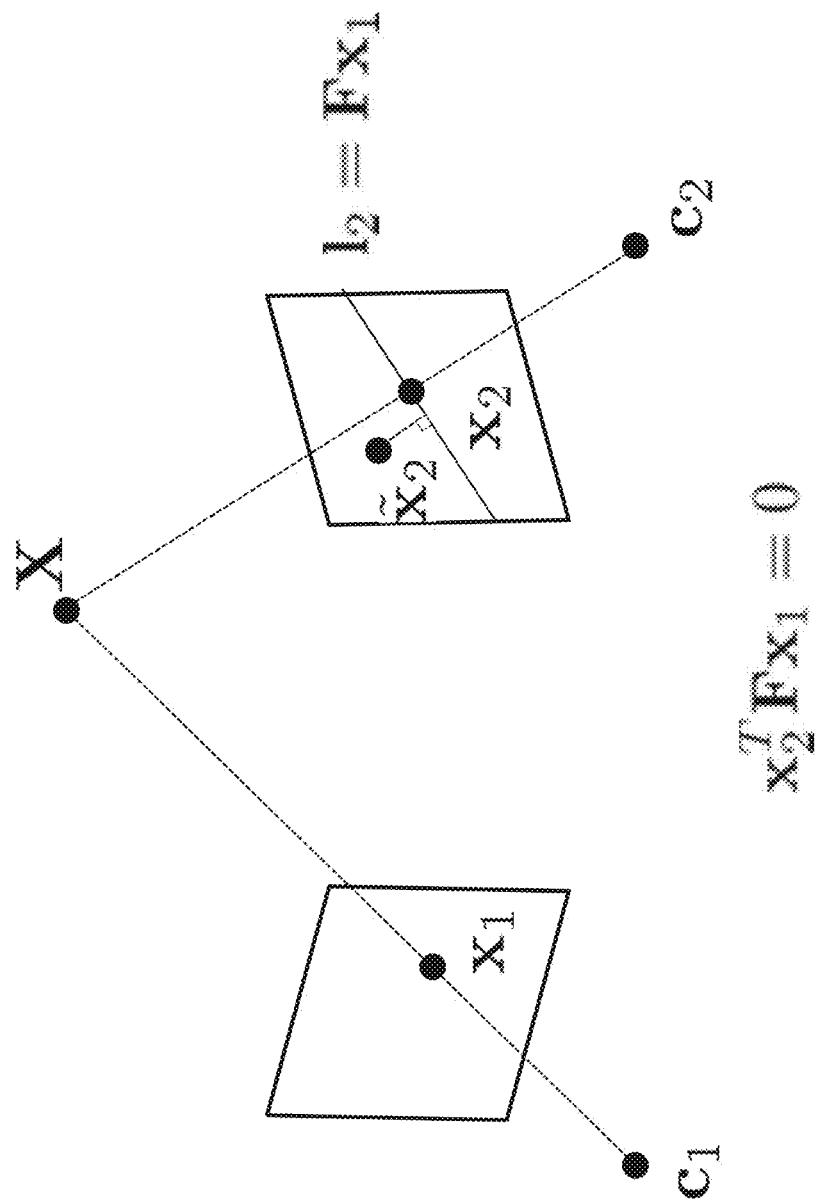
FIG. 21 illustrates a method for removing outliers among pairs of corresponding keypoints using epipolar geometry according to an example embodiment.

FIG. 21 illustrates a method for removing outliers among pairs of corresponding keypoints using epipolar geometry according to an example embodiment. From this equation, $x_1$ can be mapped to a line $l_2 = F x_1$ in the second image (see FIG. 21). In other words, the projected point on the second image plane $x_2$ always lies on the line. However, there is no guarantee that all pairs of corresponding keypoints satisfy this epipolar constraint due to noise in the image measurements and error in the optical flow matching method.

Therefore, to identify outliers among the pairs of corresponding keypoints, the orthogonal distance from the matching point in the second image $\tilde{x}_2$ to $l_2$ is calculated (see FIG. 21), and if the distance is beyond a certain threshold, then the pair of corresponding points is considered as an outlier. FIG. 21 shows the remaining inliers.

Figure 22:
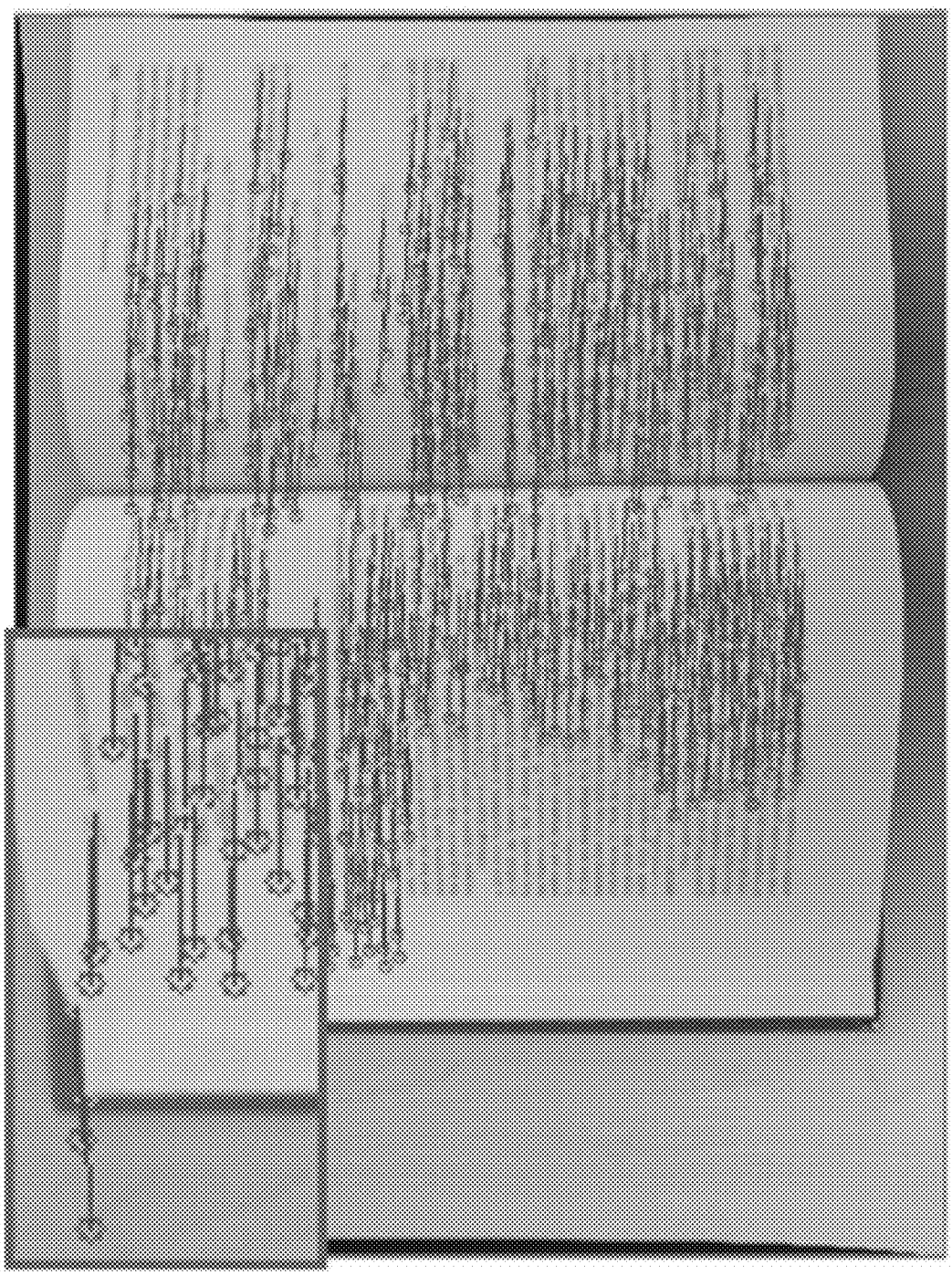
FIG. 22 illustrates optical flow disparities consistent with an example embodiment.
Figure 23:
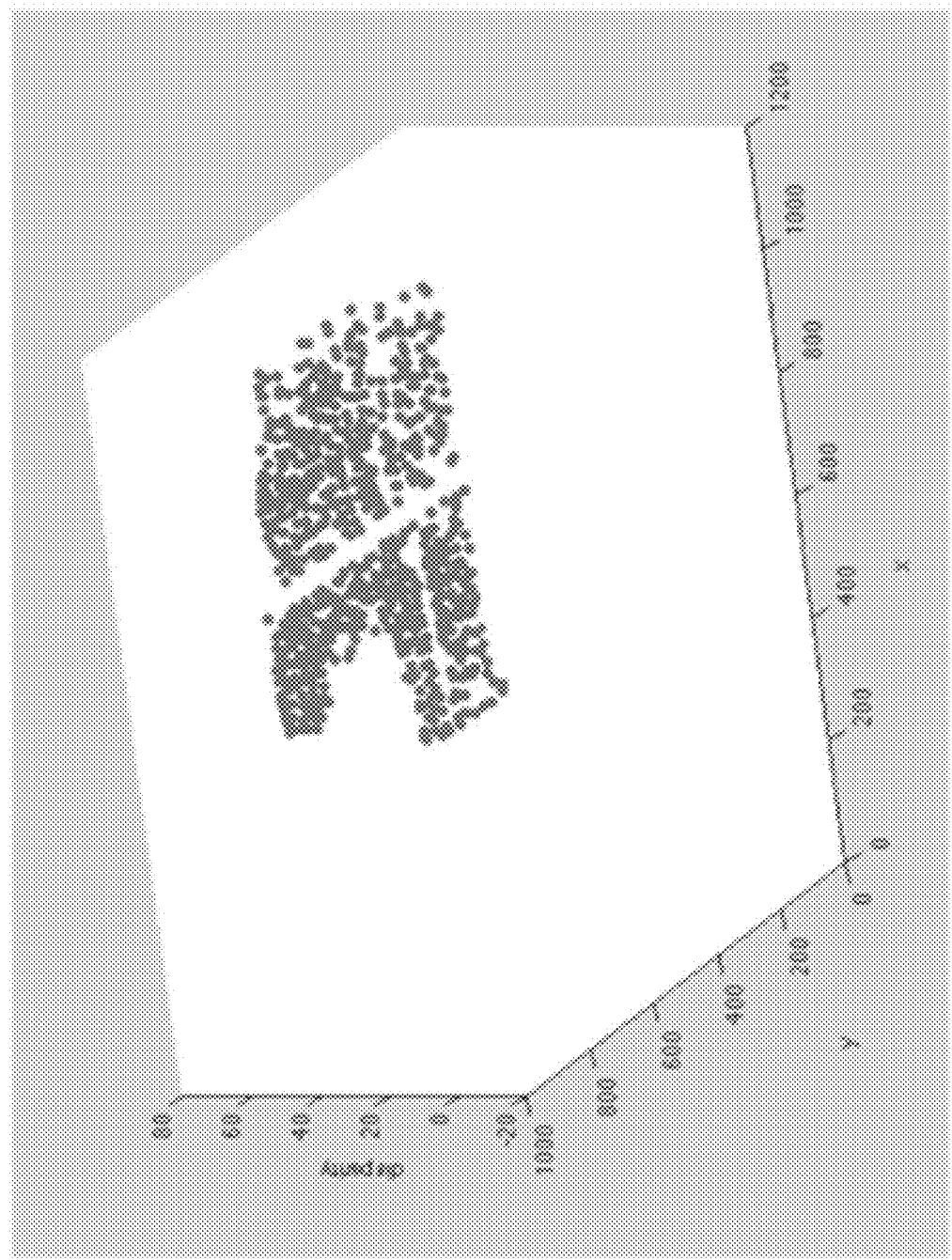
FIG. 23 illustrates the recovery of shape information according to an example embodiment.

At 1940, computing disparities from optical flow is accomplished by looking at the displacements of the tracked keypoints. As shown in FIG. 22 (the upper-left corner of FIG. 22 provides a close-up view), the points on the book page spread at different depths will have different displacements, and these disparities can be used to recover the shape of the page spread (see FIG. 23). Each dot in FIG. 23 represents a pair of corresponding points in the 3D space, where x, y values are the image coordinates of the keypoint in the first image, and the z value is the displacement of the tracked keypoint in the second image with respect to the corresponding keypoint in the first image.

Figure 24:
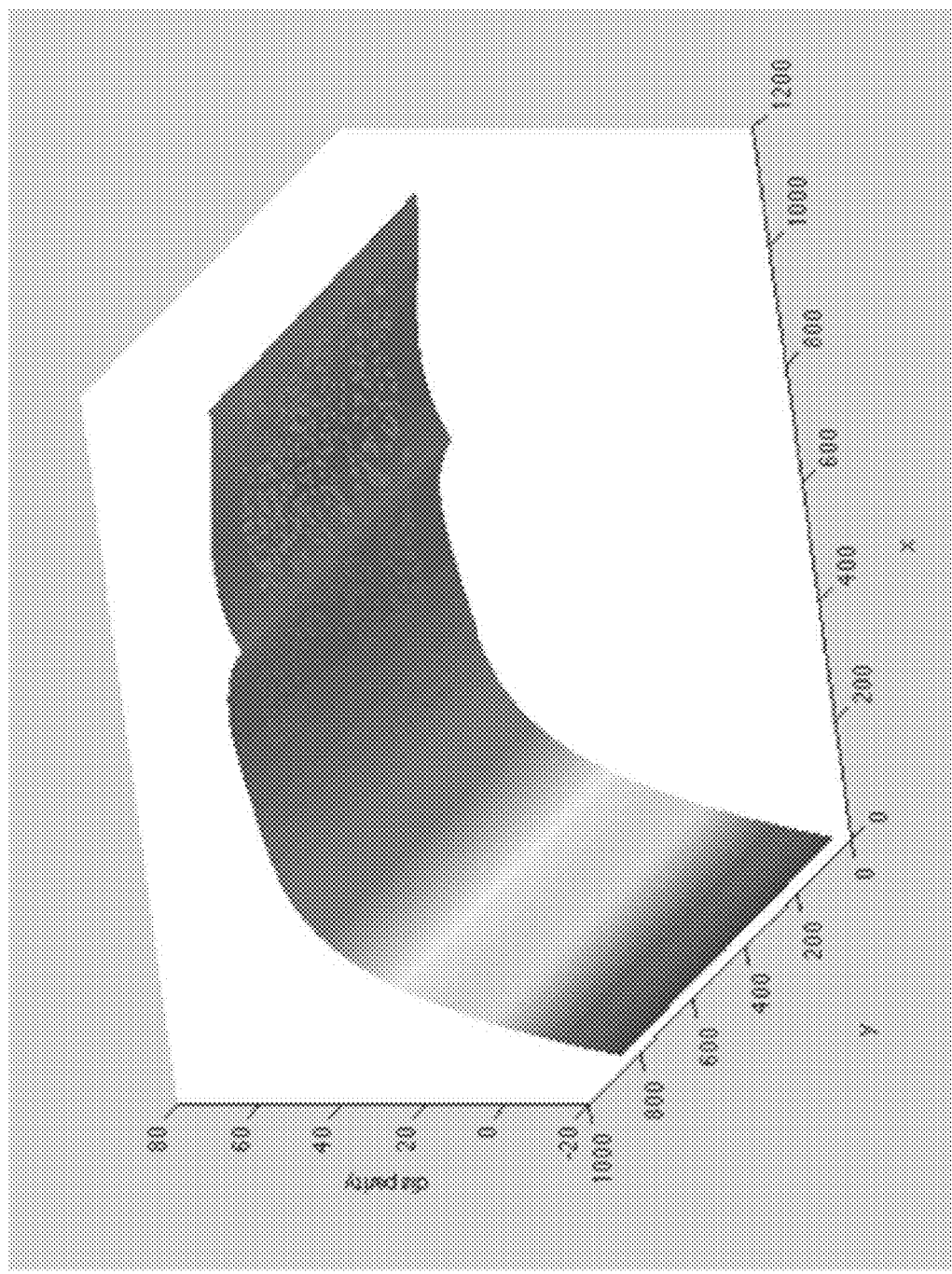
FIG. 24 illustrates surface fitting according to an example embodiment.

At 1950, a surface model is applied to the recovered 3D points using a $4^{th}$ order polynomial equation (see FIG. 24). From this surface model, a disparity map is generated by mapping the depth (z-coordinate) to a grayscale value.

At 1960, the document region is localized within the image using an image segmentation algorithm. One example of such a segmentation algorithm is GrabCut, which is available in OpenCV.

Figure 25:
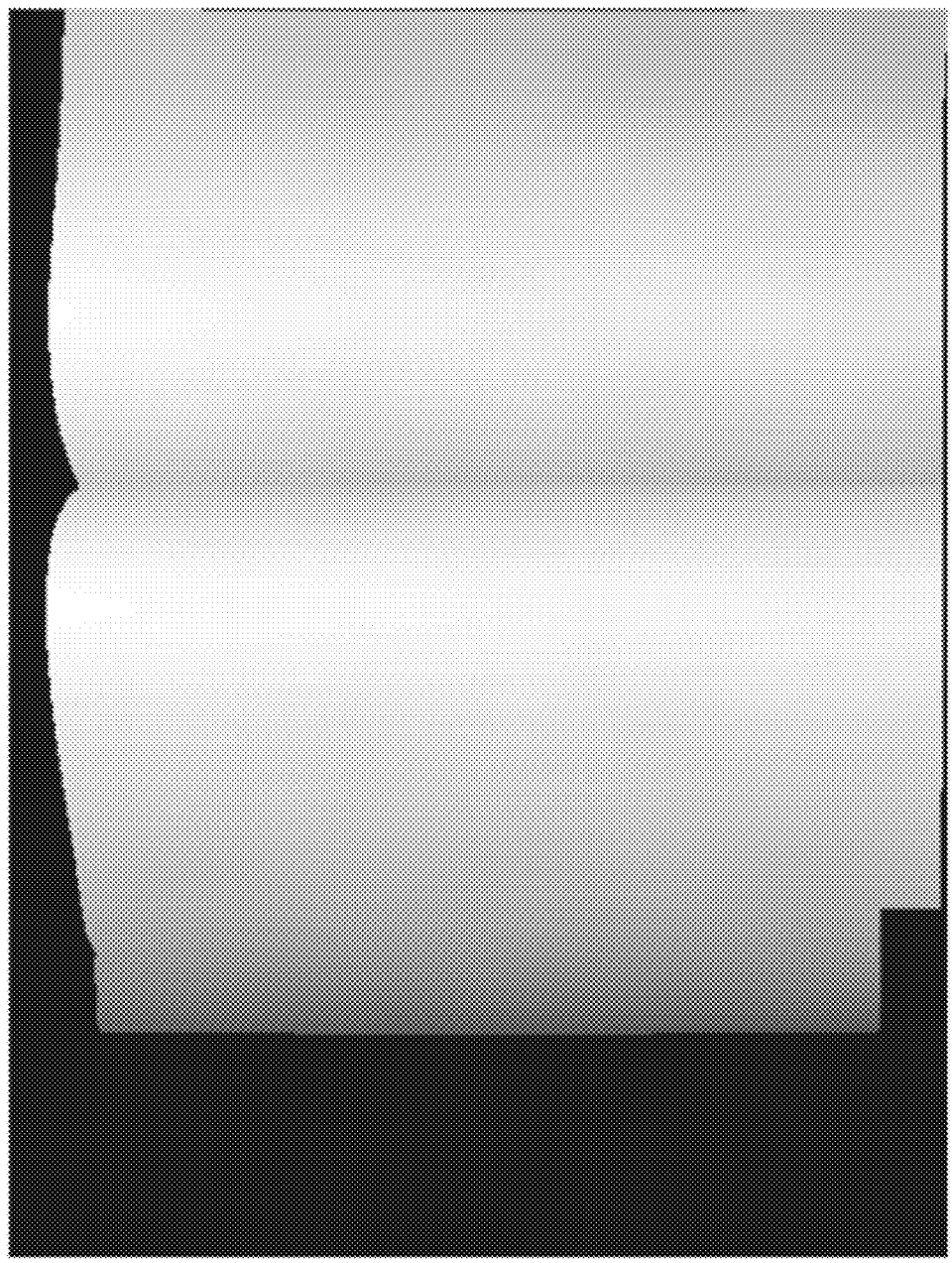
FIG. 25 illustrates a disparity map with the document region localized according to an example embodiment.

At 1970, the resulting disparity map is output. An example of such a resulting disparity map with the document region localized is shown in FIG. 25.

Figure 26:
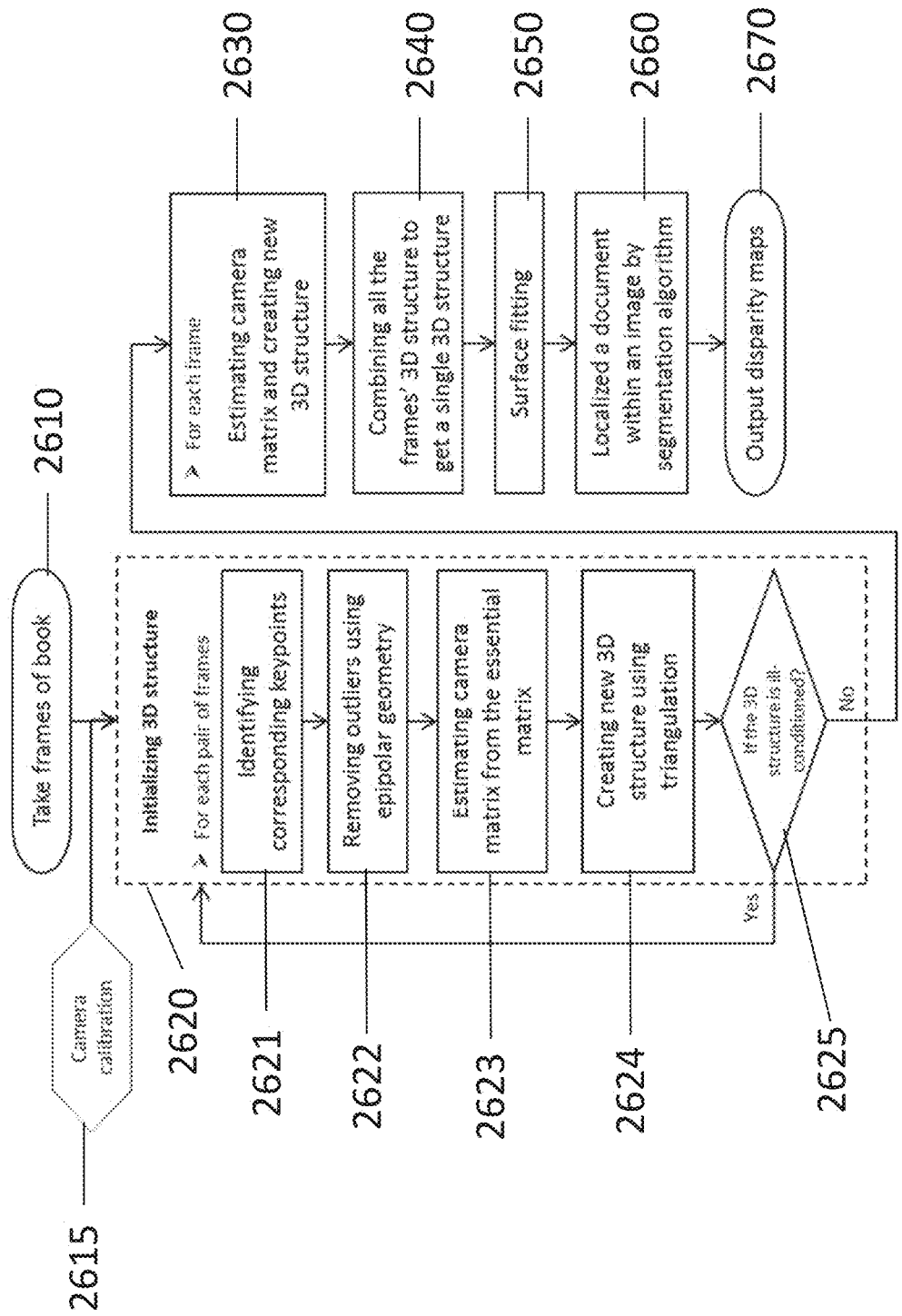
FIG. 26 is a flowchart depicting an overview of a structure from motion technique consistent with an example embodiment.

FIG. 26 is a flowchart depicting an overview of a structure from motion technique consistent with an example embodiment. As shown in FIG. 26, at 2610 a mobile phone camera captures a sequence of images of a document such as a book. At 2615, camera calibration for the mobile phone camera is performed.

At 2620, the 3D structure and camera motion is initialized from two sequential frames. Specifically, the first camera matrix $P_1 = K[I_{3\times3}|0_{3\times1}]$ is set to be aligned with the world coordinate frame, where K is the camera calibration matrix. At 2621, the corresponding keypoints between those two frames are identified and the fundamental matrix F is estimated using a RANSAC algorithm, which is available in the OpenCV library. At 2622, the fundamental matrix is used to remove outliers using epipolar geometry, as described above, and the essential matrix $E = K^T F K$ is determined. Once the essential matrix is determined, it is possible to recover the camera pose (rotation R and translation t) for the second frame with respect to the camera pose for the first frame. Then, at 2623, the camera matrix for the second frame, $P_2$ can be obtained by multiplying the camera calibration matrix K by the camera pose for the second frame [R|t]. At 2624, 3D point structure is estimated from the 2D corresponding points and $P_2$ by using triangulation.

The algorithm for the fundamental matrix might not produce a well-conditioned initial 3D structure due to noise in the image measurements. Therefore, at 2625, ill-conditioned structures are rejected. An example of an ill-conditioned initial 3D structure is shown in FIG. 27(a). FIG. 27(b) shows an example of a well-conditioned 3D structure from the selected pair of frames.

The criterion of rejection is based on the prior knowledge that the shape of a book spread page is almost always two slightly curved surfaces that are not too far from a plane. Therefore, a dominant plane is detected using a RANSAC algorithm from the generated 3D structure and the orthogonal distance is calculated for each 3D point to the plane. If the average distance is less than the predefined threshold then the pair of frames is accepted. Alternatively, the pair of frames is rejected and the next pair of frames is checked. The threshold can be fixed under an assumption that the distance between the camera and the target is almost consistent across different users.

Another option for computing the fundamental matrix is to use a non-linear optimization technique. One advantage of this option is that it might improve the accuracy of the camera pose. One disadvantage is that it requires more processing.

At 2630, after an initial 3D point structure is determined, it is considered how to use a new frame to update it. It is assumed that the 3D point structure for the (i−1)-th frame is already known and the existing corresponding points have been tracked from the (i−1)-th frame to the i-th frame. As described above, outliers are removed from the tracked points using epipolar geometry. The remaining points and the corresponding 3D points are used to estimate the new camera pose for i-th image $P_i$ by minimizing the back-projection error $$e = \Sigma_j \|x_j^{(i)} - P_i X_j\|^2,$$

where $x_j^{(i)}$ is the j-th tracked 2D point in the i-th image and $X_j$ is the corresponding j-th 3D point. Given this estimated camera matrix $P_i$ and the tracked points in the i-th frame, the 3D point structure is recalculated using triangulation. The above process is reiterated throughout the sequence of frames. FIG. 28(*a*) shows a 3D point structure for each iteration and camera pose frames with different colors. At 2640, to get a single 3D structure from all the frames' 3D structures, they are combined by simple averaging (see FIG. 28(*b*)). The final 3D structure still has outliers as can be seen from the right most corner of the structure in FIG. 28(*b*). In order to deal with this, at 2650, the surface fitting algorithm is performed with a RANSAC algorithm.

Another option for combining all the 3D structures is to use bundle adjustment. One advantage of using bundle adjustment is that it might improve the accuracy of the camera poses and the 3D structures. Since according to an example embodiment, the camera motion is very simple (basically linear), the improvement may be small. One disadvantage of using bundle adjustment is that it requires more processing.

At 2660, the document region is localized within the image using an image segmentation algorithm.

At 2670, the resulting disparity map is output.

According to an example embodiment, "single-frame" OCR may be employed by considering the frame in the middle of the frame sequence, in which both pages of the book spread are typically in view. This is a good frame to use as a single representative image for the book page spread.

According to an example embodiment, "multi-frame" OCR may be employed, wherein more than one frame is used for doing the OCR. For instance, the left page may be more likely to be better captured in the early frames and the right page in the later frames. Some frames may also be in better focus than others. The OCR score for multi-frame OCR is the best score for each page over the set of frames.

According to an example embodiment, the Apple iPhone 4S may be employed as the mobile phone, however, example embodiments are not limited to this configuration. In particular, an app for capturing a sequence of hi-res frame images (8MP) may be built in Objective-C. The optical flow and structure from motion modules may be built in C++ and may use the OpenCV library. The dewarping part of the pipeline may be implemented in Java and C# versions.

According to one experimental evaluation based on OCR, six images of book page spreads were taken with the iPhone 4S camera, wherein the device was handheld (i.e., a tripod was not used). The frame rate was about 1 fps, and the frame image resolution was 8 MP. The boundary text lines on the two pages in each page spread were examined: {top-left, top-right, bottom-left, bottom-right}.

The open-source Tesseract OCR engine may be used. For measuring the difference between two text strings, the edit distance (Levenshtein distance), normalized by dividing by the length of the ground-truth string may be used.

Figure 30:
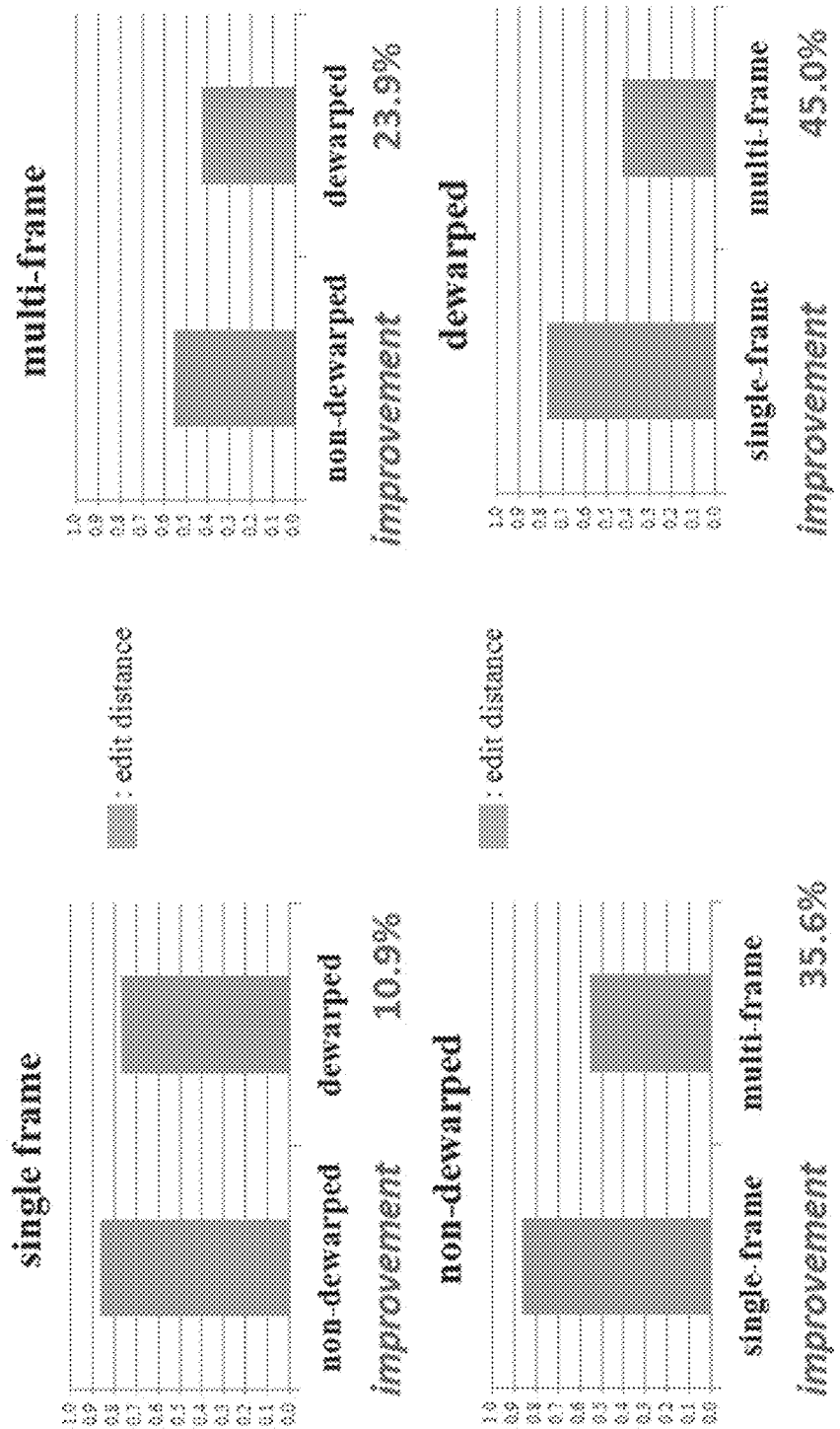
FIG. 30 shows optical character recognition (OCR) evaluation results consistent with an example embodiment.

An evaluation of the optical flow method is provided below. Specifically, an example of before/after dewarping is shown in FIG. 29. The OCR evaluation results are shown in the tables in FIG. 30. In all the cases, the results show better OCR performance.

Moreover, other implementations of the embodiments will be apparent to those skilled in the art from consideration of the specification and practice of the embodiments disclosed herein. Various aspects and/or components of the described embodiments may be used singly or in any combination. It is intended that the specification and examples provided be considered as examples only, with a true scope and spirit of the embodiments being indicated by the following claims.

What is claimed is:

1. A mobile device, comprising:
   a camera configured to capture a sequence of image frames of at least one document page; and
   a processor configured to compute a disparity map using the captured sequence of image frames; compute a model of the at least one document page by generating a cylindrical three dimensional geometric surface using the computed disparity map; and render a dewarped image from the computed model,
   wherein the disparity map comprises features within the at least one document page.

2. The device of claim 1, wherein the disparity map is computed with an optical flow technique.

3. The device of claim 1, wherein the disparity map is computed with a structure from motion technique.

4. The device of claim 1, wherein the cylindrical three dimensional geometric surface is constructed using profile curves computed from the disparity map.

5. The device of claim 1, wherein the processor is configured to compute the disparity map using a sequence of image frames representing a single linear path of the mobile device over the at least one document page.

6. The device of claim 1, wherein the processor is configured to render multiple dewarped images; perform optical character recognition on the multiple dewarped images and merge the results thereof.

7. A method comprising:
   capturing a sequence of image frames of at least one document page;
   computing a disparity map using the captured sequence of image frames;
   computing a model of the at least one document page by generating a cylindrical three dimensional geometric surface using the computed disparity map; and
   rendering a dewarped image from the computed model,
   wherein the disparity map comprises features within the at least one document page.

8. The device of claim 1, wherein the processor is further configured to compute the disparity map based on displacements, between ones of the image frames, of tracked key points on the at least one document page between ones of the image frames of the sequence of image frames,
   wherein the features comprise the tracked key points.

9. The device of claim 1, wherein the processor is further configured to identify the tracked key points by a random sample consensus (RANSAC) algorithm of an OpenCV library.

10. The device of claim 1, wherein the processor is further configured to compute the disparity map by mapping a depth coordinate, of the at least one document page from the sequence of image frames, to a grayscale value.

11. The method of claim 7, further comprising:
    rendering multiple dewarped images; and performing optical character recognition on the multiple dewarped images and merging the results thereof.

12. A non-transitory computer readable storage medium storing instructions for executing a process, the process comprising: computing a disparity map using a sequence of image frames of at least one document page;

computing a model of the at least one document page by generating a cylindrical three dimensional geometric surface using the computed disparity map; and rendering a dewarped image from the computed model, wherein the disparity map comprises features within the at least one document page.

* * * * *